United States Patent
Ray et al.

(10) Patent No.: US 9,482,736 B1
(45) Date of Patent: Nov. 1, 2016

(54) CASCADED ADAPTIVE BEAMFORMING SYSTEM

(71) Applicant: The Trustees of Dartmouth College, Hanover, NH (US)

(72) Inventors: Laura Ray, Hanover, NH (US); Teresa Ou, Pearl City, HI (US); Carsten Schafer, Buren (DE); Alaa Abdeen, Hanover, NH (US); Harrison Hall, Hanover, NH (US)

(73) Assignee: THE TRUSTEES OF DARTMOUTH COLLEGE, Hanover, NH (US)

( * ) Notice: Subject to any disclaimer, the term of this patent is extended or adjusted under 35 U.S.C. 154(b) by 0 days.

(21) Appl. No.: 14/703,989

(22) Filed: May 5, 2015

Related U.S. Application Data

(63) Continuation-in-part of application No. 13/835,301, filed on Mar. 15, 2013.

(60) Provisional application No. 61/989,180, filed on May 6, 2014.

(51) Int. Cl.
   *G01S 3/80* (2006.01)
   *G01S 3/808* (2006.01)

(52) U.S. Cl.
   CPC .......................... *G01S 3/808* (2013.01)

(58) Field of Classification Search
   CPC .......................................... G01S 3/808
   See application file for complete search history.

(56) References Cited

U.S. PATENT DOCUMENTS

| | | | |
|---|---|---|---|
| 3,510,871 A * | 5/1970 | Tamama et al. ........ | G01S 1/02 342/156 |
| 5,477,858 A | 12/1995 | Norris et al. ................. | 600/441 |
| 5,720,289 A | 2/1998 | Wright et al. ................ | 600/443 |
| 6,309,356 B1 | 10/2001 | Ustuner et al. .............. | 600/443 |
| 8,213,634 B1 | 7/2012 | Daniel ........................... | 381/92 |
| 8,233,352 B2 | 7/2012 | Beaucoup ..................... | 367/119 |
| 8,498,178 B2 | 7/2013 | Antoine et al. .............. | 367/138 |
| 2001/0051772 A1* | 12/2001 | Bae .................... | G01S 7/52034 600/447 |
| 2002/0082500 A1 | 6/2002 | Henderson et al. .......... | 600/443 |
| 2002/0150263 A1 | 10/2002 | Rajan .............................. | 381/92 |
| 2008/0085023 A1 | 4/2008 | Kulkarni et al. ............. | 381/320 |
| 2009/0306512 A1* | 12/2009 | Loftman ............ | G01S 7/52046 600/447 |
| 2011/0129097 A1 | 6/2011 | Andrea ........................ | 381/71.6 |
| 2011/0149924 A1 | 6/2011 | Trainin et al. ................ | 370/337 |
| 2011/0295122 A1 | 12/2011 | Miller .......................... | 600/447 |
| 2012/0087204 A1 | 4/2012 | Urbano et al. .................. | 367/13 |
| 2012/0169826 A1 | 7/2012 | Jeong et al. ............... | 348/14.01 |

OTHER PUBLICATIONS

Ajdler et al., *Acoustic Source Localization in Distributed Sensor Networks*, Conference Record of the Thirty-Eighth Asilomar Conference on Signals, Systems and Computers, 2004, vol. 2, No. 2, pp. 1328-1332, Nov. 7-10, 2004.

(Continued)

*Primary Examiner* — Luke Ratcliffe
*Assistant Examiner* — Hovhannes Baghdasaryan
(74) *Attorney, Agent, or Firm* — Lathrop & Gage LLP

(57) ABSTRACT

A system and device phase-aligns and sums signals from a very large array of sensors, such as microphones or ultrasonic transducers, without prior knowledge of time delays of signals reaching each sensor, so as to accommodate effects of reverberant fields or acoustic or ultrasonic media containing multiple reflectors or scatterers and/or having heterogeneous, unknown acoustic properties.

43 Claims, 19 Drawing Sheets

(56) References Cited

OTHER PUBLICATIONS

Benesty et al., *On Microphone-Array Beamforming from a MIMO Acoustic Signal Processing Perspective,* IEEE Transaction on Audio, Speech, Language Processing, vol. 15, Issue 3, pp. 1053-1065, Mar. 2007.

Capon, *High Resolution Frequency-Wavenumber Spectrum Analysis,* Proceedings of the IEEE, vol. 57, Issue 8, pp. 1408-1418, Aug. 1969.

Cohen, *Speech Processing in Modern Communication,* STSP 3, pp. 199-223. Springer-Verlag, Berlin (2010).

Dmochowski et al., *Combined Beamforming and Noise Cancellation,* Proceedings of the IEEE Instrumentation and Measurement Technology Conference (IMTC 2005), vol. 2, pp. 1033-1037, May 16-19, 2005.

Ericson, *Military Speech Communications over Vocoders in Tandem,* In New Directions for Improving Audio Effectiveness (pp. 11-1-11-8). Meeting Proceedings RTO-MP-HFM 123, Paper 11. Neuilly-sur-Seine, France: RTO (2005), http://www.rto.nato.int/abstracts.aps.

Fairbanks, *Test of Phonemic Differentiation: The Rhyme Test,* The Journal Acoustical Society of America, vol. 30, Issue 7, pp. 596-600, 1958.

Gan et al., *The Non-Canonical LMS Algorithm (NCLMS): Characteristics and Analysis,* IEEE Conference on Acoustics, Speech, and Signal Processing, vol. 3, pp. 2137-2140, Apr. 14-17, 1991.

Greenleaf et al., *Clinical Imaging with Transmissive Ultrasonic Computerized Tomography,* IEEE Transactions on Biomedical Engineering, vol. BME-28, No. 2, pp. 177-185, Feb. 1981.

Havelock, *A Large Microphone Array for Outdoor Sound Propagation Studies,* ASA 128th Meeting—Austin, Texas Nov. 28-Dec. 2, 1994, 1 page; accessed on the Internet (May 16, 2013) http://www.auditory.org/asamtgs/asa94aus/2aSP/2aSP7.html.

Henry et al., *Comparison of Acoustic Properties of Two USMC Helmets,* Army Research Lab, Aberdeen Proving Ground, MD. ARL-TR-4383, 26 pages, Feb. 2008.

House et al., *Articulation-Testing Methods: Consonantal Differentiation with a Close-Response Set,* The Journal Acoustical Society of America, vol. 37, Issue 1, pp. 158-166, 1965.

Khanna et al., *Adaptive Beam Forming Using a Cascade Configuration,* IEEE Transactions on Acoustics, Speech, and Signal Processing, vol. ASSP-31, No. 4, pp. 940-945, Aug. 1983.

Kushwaha et al., *Acoustic Source Localization and Discrimination in Urban Environments,* 12th International Conference on Information Fusion, Fusion '09, pp. 1859-1866, 8 pages, Jul. 6-9, 2009.

Ledeczi et al., *Multiple Simultaneous Acoustic Source Localization in Urban Terrain,* Fourth International Symposium on Information Processing in Sensor Networks, 2005, IPSN 2005, pp. 491-496, Apr. 15, 2005.

Mancini, *Op Amps for Everyone,* Design Reference, Texas Instruments, Dallas, Texas, 464 pages, Aug. 2002.

Oppenheim et al., *Discrete-Time Signal Processing,* Prentice Hall, Upper Saddle River, New Jersey (1990), Chapters 1-4, 263 pages.

Oppenheim et al., *Discrete-Time Signal Processing,* Prentice Hall, Upper Saddle River, New Jersey (1990), Chapters 5-7, 300 pages.

Oppenheim et al., *Discrete-Time Signal Processing,* Prentice Hall, Upper Saddle River, New Jersey (1990), Chapters 8-11 and Appendices, 330 pages.

Reed et al., *Time Delay Estimation Using the LMS Filter-13 Static Behavior,* IEEE Transactions on Acoustics, Speech, and Signal Processing, vol. ASSP-29, No. 3, pp. 561-570, Jun. 1981.

Reuters, ClearOne to Unveil Beamforming Microphone Array with Adaptive Steering and Next Generation Acoustic Echo Cancellation Technology, at InfoComm 2012, accessed on the Internet, 3 pages, http://www.reuters.com/article/2012/06/04/idUS105707+04-Jun-2012+PRN20120604 Jan. 2, 2013.

Silverman et al., *The Huge Microphone Array,* Technical report, LEMS, Brown University, 52 pages, 1996.

Weinstein et al., *Loud: A 1020-Node Modular Microphone Array and Beamformer for Intelligent Computing Spaces,* MIT/LCS Technical Memo MIT-LCS-TM-642, 20 pages, 2004.

Wilson et al., *Audiovisual Arrays for Untethered Spoken Interfaces,* In: Proceedings of the $4^{th}$ IEEE International Conference on Multimodal Interfaces (ICMI '02), 6 pages, 2002.

Yiu et al., *Reconfigurable Acceleration of Microphone Array Algorithms for Speech Enhancement,* International Conference on Application-Specific Systems, Architectures and Processors,(ASAP 2008), pp. 203-208, Jul. 2-4, 2008.

\* cited by examiner

Power (db), Broadside at 0.00 degrees

Power (db), Broadside at 0.00 degrees

Power (db), Broadside at 0.00 degrees

CASCADED ADAPTIVE BEAMFORMING SYSTEM

CROSS-REFERENCE TO RELATED APPLICATION(S)

This patent application is a continuation-in-part of, and therefore claims priority from, U.S. patent application Ser. No. 13/835,301 entitled BEAMFORMING SENSOR NODES AND ASSOCIATED SYSTEMS filed on Mar. 15, 2013 (U.S. Patent Publication No. 2014/0269198), which is hereby incorporated herein by reference in its entirety. This patent application also claims the benefit of U.S. Provisional Patent Application No. 61/989,180 entitled CASCADED ADAPTIVE BEAMFORMING SYSTEM filed on May 6, 2014, which is hereby incorporated herein by reference in its entirety.

U.S. GOVERNMENT RIGHTS

This invention was made with government support under grant/contract number IIP-1312440 awarded by the National Science Foundation and under grant/contract number IIP-1112753 awarded by the National Science Foundation. The government has certain rights in the invention.

FIELD OF THE INVENTION

A system and device phase-aligns and sums signals from a very large array of sensors, such as microphones or ultrasonic transducers, without prior knowledge of time delays of signals reaching each sensor, so as to accommodate effects of reverberant fields or acoustic or ultrasonic media containing multiple reflectors or scatterers and/or having heterogeneous, unknown acoustic properties.

BACKGROUND

Beamforming is a signal processing technique for increasing signal-to-noise ratio (SNR) through directional or spatial selectivity of signals transmitted through an array of antennae or transducers or received from an array of sensors. In traditional delay-and-sum beamforming, signals from multiple sensors are delayed according to distance to the focus point of the beamformer and the speed-of-sound in the medium and are summed to provide a beamformed signal with increased signal-to-noise ratio. While the traditional delay-and-sum beamformer works in environments where these delays are well known, e.g., free-field acoustic environments, or homogeneous media that are free of reflectors and scatterers, delay-and-sum beamforming fails in reverberant environments, because the time delays between sensor elements are generally unknown based solely on distance and speed-of-sound and are dependent on the frequency response and acoustic properties of the acoustic environment. If the environment is not homogeneous in its properties, delays calculated based solely on geometry and an average speed-of-sound can result in reduced signal-to-noise ratio after beamforming.

The use of delay-and-sum beamforming in medical ultrasound is commonly known. Traditional delay-and-sum beamforming of signals transmitted and received by individual elements using fixed delays counteracts dispersion of the transmitted and received signals and focuses the beam. FIG. 1A is a schematic diagram showing illustration of beamforming a transmit signal to focus ultrasound on a point, and FIG. 1B is a schematic diagram showing illustration of beamforming the reflected signal to focus the expanding wavefront generated by a scatterer in the tissue. In FIGS. 1A and 1B, each rectangular element 108, 114 in the vertical line constitutes an array element. In FIG. 1A, a synchronous series of pulses 102, delayed appropriately by delay lines 104 to produce delayed transmit pulses 106 at array elements 108, causes a converging pressure wave to focus on a particular point in the tissue 110. As the wave passes boundaries of varying acoustic impedance, some energy is transmitted and some is reflected. The transmitted signal is beamformed to "steer" the beam to a focus point. In FIG. 1B, echoes 112 of the beam off of a reflector at that point are received at array elements 114 and the transduced echoes 116 are phase-aligned by delay lines 118 to produce phase-aligned echoes 120 that are beamformed by summer 122 to produce beamformed signal 124, generally using the same transducers as used to transmit the pulse (i.e., array elements 108 and 114 may be the same array elements). In pulse-echo ultrasound, time delays between signals reaching individual elements of a transducer or probe array are computed given the distance to the focus point and an average speed of sound in the tissue. Like acoustic beamforming systems, performance of delay-and-sum beamforming in ultrasound systems suffers from a number of factors, including the difference in speed of sound among different tissue types, and multiple unknown scatterers distributed through the tissue that contribute to the return signal.

In state-of-the-art ultrasound, the beamforming delays ($\tau_i$ in FIG. 1) in transmitting and receiving the pulse are generally fixed by distance and speed-of-sound in the tissue c and are implemented through a combination of analog and digital circuitry. The speed of sound is assumed to be fixed and is based largely on the speed of sound in water and a variety of tissues. However, the speed of sound in tissue varies significantly. The difference in speed of sound between various types of tissue encountered during imaging is a result of variations in compressibility and density, and it is known that the speed of sound in tissue is not constant, but may range, for example from ~1350-1600 m/s (J. Greenleaf and R. Bain, Clinical Imaging with Transmissive Ultrasonic Computerized Tomography, IEEE Trans. On Biomedical Imaging, BME-28(2), February 1981). Traditional delay-and-sum beamforming in such environments results in reduced resolution and contrast, owing to errors in focusing the transducer array on a desired location and uncertainty in origin of the contribution of the echo; fixed delays and speed of sound thus cause a "spread" in the point of focus that reduces resolution achieved in transmit and receive functions.

This point spread function (PSF) of an imaging system is its response to a point input, or spatial impulse response. A point input is the smallest pixel (2D) or voxel (3D) in the idealized image, and the PSF is the spread of the point input over a region, generally more than a single pixel/voxel in the actual image; in addition to speed of sound considerations, because the tissue is filled with scatterers, the energy at each voxel includes a contribution from many other voxels eroding the contribution from the voxel of focus. Hence, each voxel must have energy focused on it alone, as best as possible (by beamforming) to reduce scatter, and the receive function must also focus on receiving energy from that voxel as best as possible. The characteristics of the PSF in the direction of the beam depend on the center frequency and bandwidth of signals transmitted by each element of the array. The characteristics laterally and in elevation depend on element spacing, aperture of the beam and electronic beamforming performed to focus the transmit and receive beams. Resolution in an ultrasound image depends on the number of probe elements, their spacing, the probe excitation frequency f or wavelength λ, and the spatial pulse length (SPL) n, where n is the number of cycles in the pulse. For a given f and SPL, physical realization of this resolution depends on the degree to which energy can be focused on a tissue voxel, and the degree to which received reflections can be aligned through electronic beamforming.

The number of elements in an ultrasound transducer also affects the image through the appearance of grating lobes associated with spatial sampling. Additionally, incoherence between probe transducer elements spaced far apart reduces the ability to determine time delays between these elements. Therefore, common practice in beamforming large ultrasound transducer arrays incorporates apodization—weighting the contribution from each element of the array—and is required to minimize grating lobes, a form of spatial aliasing that occurs when the spacing between elements $d \geq \lambda/2$. Element size is fundamentally a manufacturing issue, i.e., there are physical limits to d. The fewer the number of elements used to beamform, the larger the gain in the direction of grating lobes. Apodization, e.g., using a Hamming window, minimizes the effect of grating lobes (spatial aliasing) inherent in beamforming with high frequency probes by de-weighting the contribution of elements on the fringes of the array, which then diminishes the contribution of these elements to the gain and limits the gain achieved through beamforming.

FIGS. 2A-2C show polar plots of the beampatterns for some exemplary forward-looking arrays of elements with and without apodization. In these examples, probe frequency is 10 MHz and element spacing is 1.25λ. FIG. 2A shows the beampatterns for an exemplary array of 32 elements without apodization, as known in the art. FIG. 2B shows the beampatterns for an exemplary array of 32 elements with Hamming window apodization, as known in the art. A 32-element probe with apodization to reduce grating lobes suffers from power loss of 5 dB. FIG. 2C shows the beampatterns for an exemplary array having 512 elements without apodization, as known in the art. A 512 element probe with identical element spacing has inconsequential grating lobes, and power increases by 30 dB over the 32-element probe with apodization. Beamwidth also decreases with increase in number of elements, demonstrating increase in resolution.

As a signal propagates through a reflector, "echoes" result from a transmitted signal reflecting off the front and rear boundary of a tissue feature. As the size of the feature decreases, the delay between reflections decreases, providing a feature size limit. The axial resolution measures the potential to distinguish between two features that are closely spaced in the axial direction. It is given by SPL/2 and is constant along the signal propagation path into the tissue. Features that are adjacent to each other along the signal path must be separated be at least SPL/2 to appear distinct. This is based on the round trip distance between two distinct reflectors and assures that the return echo from the further reflector passes the nearer reflector after the end of the pulse passes through the nearer reflector. n=2-4 cycles are used in the transmit signal; the best case (shortest pulse) axial resolution occurs for n=1 and is $$\theta_z = \frac{\lambda}{2} = \frac{c}{2f}.$$

The lateral spatial resolution, $$\theta_x = \sin\left(\frac{\lambda}{D}\right),$$

is the resolution perpendicular to the beam and determines the minimum distance required between two side-by-side features that results in two distinct echoes. D is the diameter of the array defined as Md for a linear array with M elements of spacing d. Decreasing wavelength, i.e., a higher frequency probe, and increased number of probe elements, provide increased resolution axially and laterally. With a 5-10 MHz probe, the wavelength is sub-mm; however, imaging through several cm of tissue is difficult owing to the signal losses as penetration depth increases. To work at high probe frequencies, signal amplification is required to maintain sufficient signal-to-noise ratio and contrast-to-noise ratio in the image, as discussed below.

Adaptive beamforming, in which delays are estimated, can improve focusing and is not dependent on knowing the speed-of-sound along the beam path. Improved electronic focusing through adaptive beamforming, both in time (reducing error in time delays) and in space (beamforming of orders of magnitude more sensor elements than present technology), is required to improve resolution. By reducing time delay uncertainty, the resolution achieved becomes largely dependent on geometry, spatial pulse length (SPL), and probe frequency and is described by a voxel in space, with lateral, axial, and elevation components. However, in systems with a large number of sensor elements, such as ultrasound transducer arrays, there is no known method from the prior art to manage the computation required for adaptive beamforming in real time or near real time to produce images in real time or near real time. Prior art adaptive beamforming systems suffer from lack of scalability as the number of channels increases. As the number of channels increases, the complexity of the computations required to add the signals coherently grows, as each channel must be correlated with each other channel, shifted in time, and summed. The complexity of estimating time delays using adaptive filters also grows in relation to the number of transducer elements. Additionally, incoherence between probe transducer elements spaced far apart reduces the ability to determine time delays between these elements, either based on distance and speed-of-sound or using adaptive time delay estimation.

Existing systems for beamforming generally use digital signal processors but are limited in throughput by the speed of the processor, the capacity and throughput of the data bus, and the number of input/output channels the DSP device may accommodate. Accordingly, prior beamforming systems have generally been limited in number of channels in order to permit real-time or near real-time processing.

There are physical limits on energy that can be put into the tissue on the transmit cycle to avoid tissue heating; therefore, the signal amplification should occur on the reflected signal. The beamforming process amplifies the signal relative to the noise providing a theoretical maximum signal gain of 10 log M; hence, beam-forming as many elements simultaneously as possible, increases SNR in the reflected signal. This in turn translates to improved image contrast. Current probes have 128 to 256 elements or more, but do not beamform all signals simultaneously owing to as-of-yet insurmountable technical issues with high frequency sampling and pushing terabytes of data through beamforming signal processing channels. Beamforming is generally performed using analog electronics on 32-64 elements at a time and apodization described above.

BRIEF DESCRIPTION OF THE DRAWINGS

The foregoing features of embodiments will be more readily understood by reference to the following detailed description, taken with reference to the accompanying drawings, in which:

FIG. 2A shows the beampatterns for an exemplary array of 32 elements without apodization, FIG. 2B shows the beampatterns for an exemplary array of 32 elements with Hamming window apodization, and FIG. 2C shows the beampatterns for an exemplary array having 512 elements without apodization, as known in the art;

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Embodiments of the invention comprises methods and systems for adaptive beamforming of a large number of sensor elements where low coherence between elements that are physically separated by a significant distance relative to signal path and associated physical and attenuation characteristics of the medium cause substantial errors in traditional delay-and-sum beamforming. Embodiments break the beamforming process into the smallest increment—beamforming of two sensor elements—and cascades the computation as a binary tree or more generally as a parallel set of computations, or some combination of these two attributes. Certain exemplary embodiments incorporate parallel adaptive filters for time delay estimation and phase alignment of signals, where the delay between the two signals can be as small as a fraction of a sample.

It is known that adaptive least-mean square (LMS) filters are able to estimate the time delay between two signals (see Read et al., 1981 Time Delay Estimation using the LMS Filter—Static Behavior, IEEE Trans. On Acoustics, Speech, and Signal Processing, ASSP-29(3), pp. 561-570, June 1981 and derivatives thereof). However, in applications such as ultrasound, there are many signals, which require many independent filters, and the range of time delay between any two elements can be less than one sample time to many multiples of the sample time, requiring very long filters for delay estimation. Instantiation of long filters requires many processors operating in parallel and a large amount of memory, which is cost prohibitive. Such filters are digital by nature, requiring signals to be sampled at a regular interval, and the delay may not be an integer multiple of the sample time. Exemplary embodiments overcome the need for very long filters in delay estimation and enable phase alignment of signals delayed by a fraction of a sample.

Figure 1A:
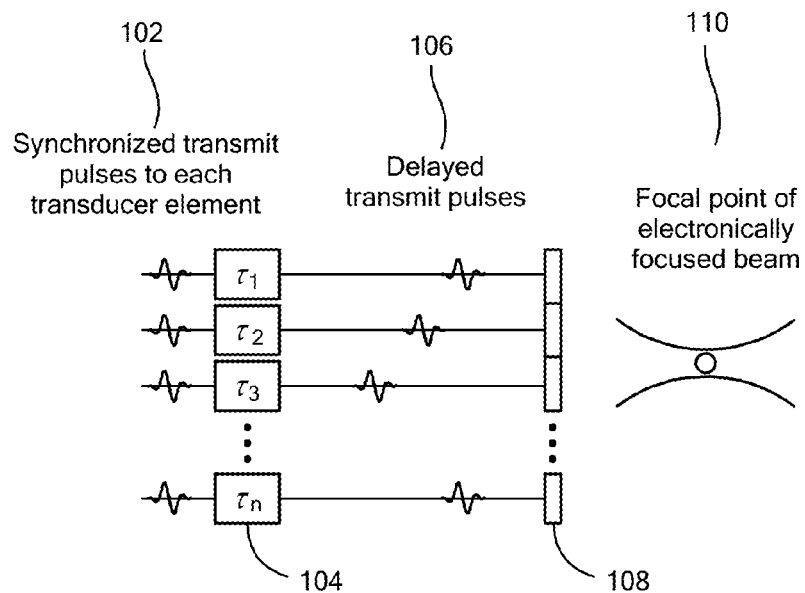
FIG. 1A is a schematic diagram showing illustration of beamforming a transmit signal to focus ultrasound on a point, as known in the art.
Figure 1B:
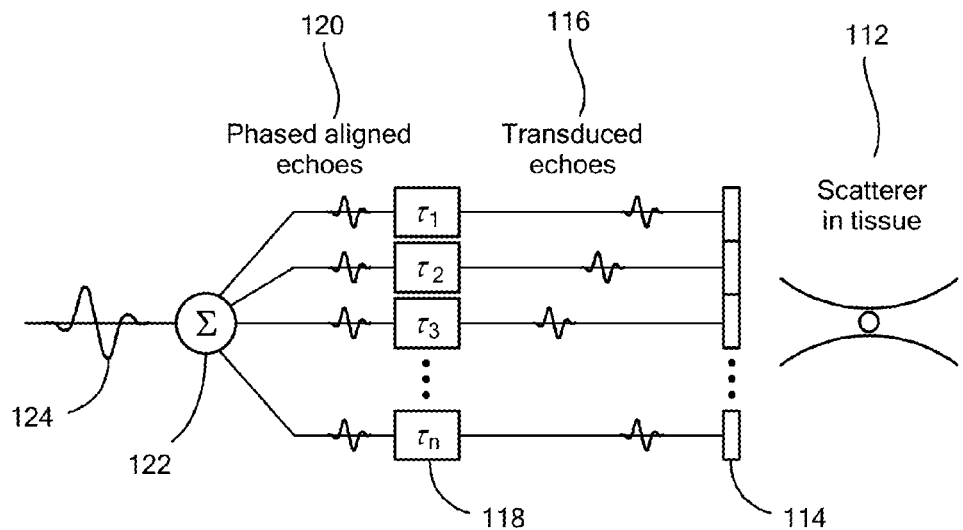
FIG. 1B is a schematic diagram showing illustration of beamforming the reflected signal to focus the expanding wavefront generated by a scatterer in the tissue, as known in the art.
Figure 2A:
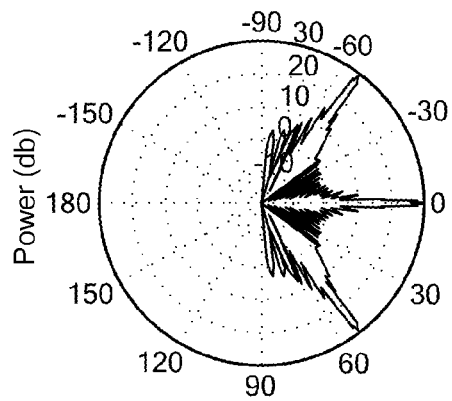
FIGS. 2A-2C show polar plots of the beampatterns for some exemplary forward-looking arrays of elements with and without apodization, where
Figure 2B:
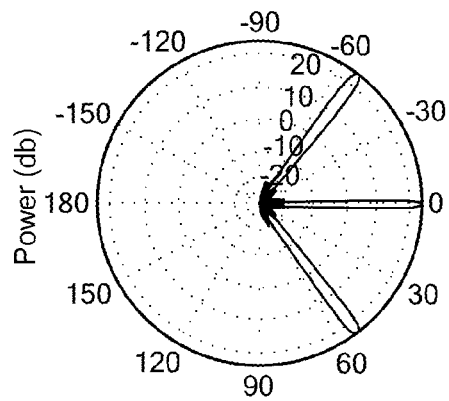
Figure 2C:
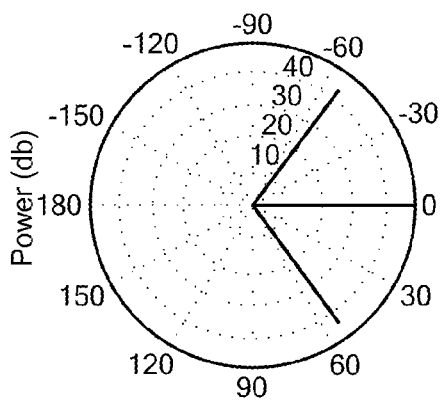
Figure 3:
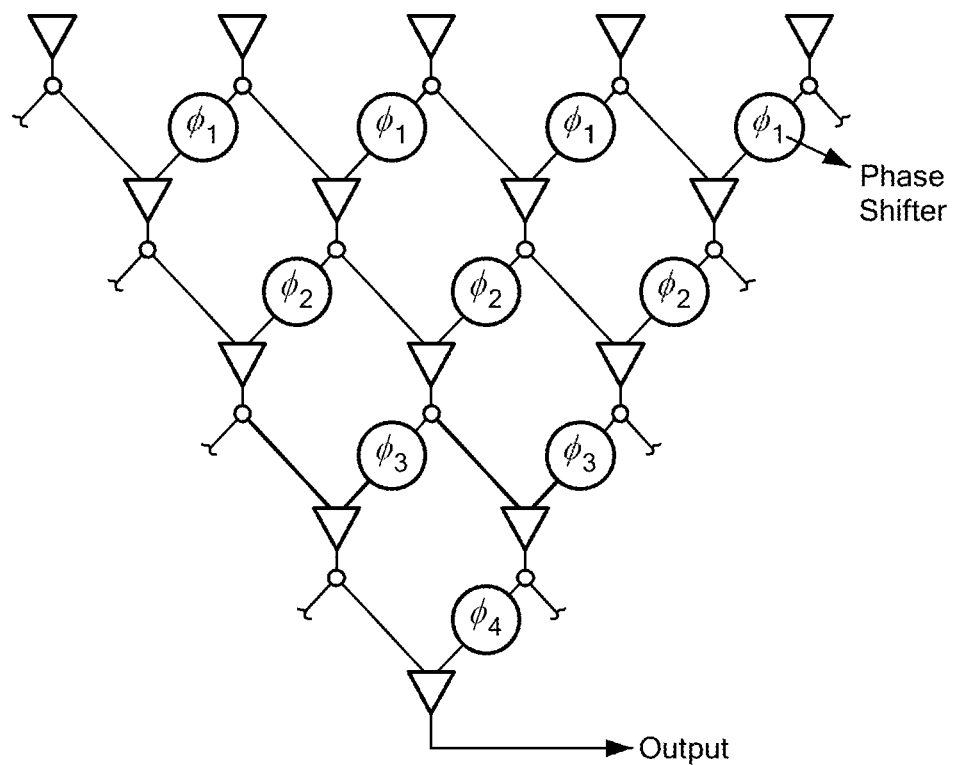
FIG. 3 shows a schematic block diagram of a Davies null steering network, as known in the art.
Figure 4:
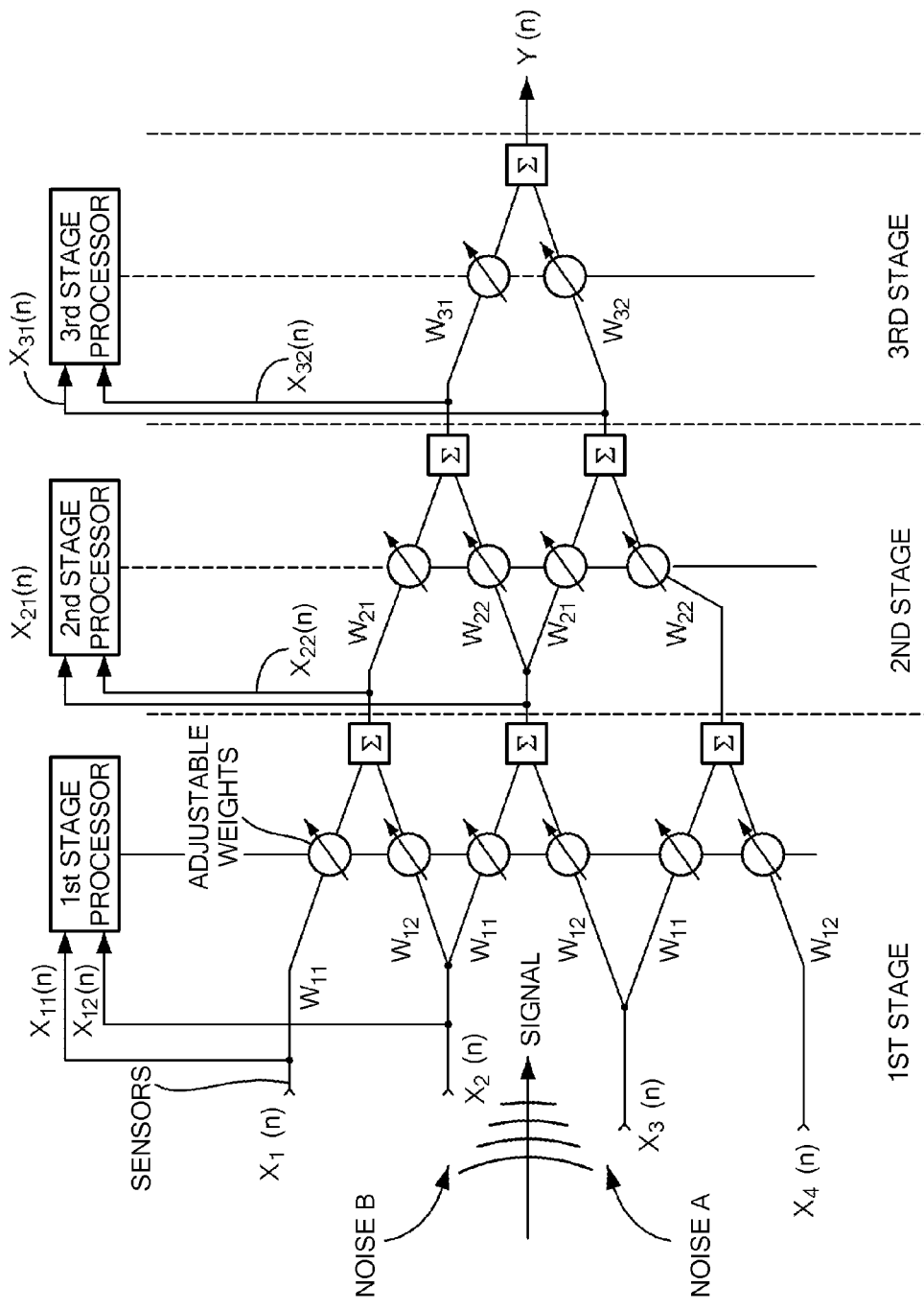
FIG. 4 shows a four-element adaptive cascade processor of Khanna and Madan, as known in the art.

There are examples of cascaded beamformers in the prior art, for example, Khanna and Madan, Adaptive beam Forming using a Cascade Configuration, IEEE Trans. On Acoustics, Speech, and Signal Processing ASSP-31 No. 4, August 1994, which suggest reconfiguration of an array as a series of sub-arrays of two elements each (see FIG. 3, which shows a Davies null steering network as known in the art, and FIG. 4, which shows a four-element adaptive cascade processor of Khanna and Madan as known in the art) and iterative calculation of an inverse correlation matrix to null or cancel noise sources in arbitrary directions when steering an array to a known direction. In the ultrasound beamforming application, however, the objective is not to cancel noise sources in arbitrary directions, but rather to phase-align signals, and, in practice, the computation needed to perform the correlation function required by this architecture does not allow real or near real-time operation. Moreover, computational requirements at each level of the architecture are reduced by a factor of only 1/L, where L is the number of channels at each level. This stems from the focus of the architecture on nulling noise sources from other directions.

Embodiments of the present invention make it possible to phase-align signals from a very large sensor array in a cascaded system forming a binary tree of one or more layers, such that the most coherent signals are phase-aligned at each level, increasing signal-to-noise ratio of pairs of beamformed signals by a factor of two and improving coherence between sensors separated by large distances. This makes it possible to perform this phase alignment without prior knowledge of the speed-of-sound or its variation throughout the medium. A computational architecture for the disclosed embodiments makes it possible to provide data throughput on the order of a terabyte of data per second, which is necessary to beamform very large sensor arrays where individual signals are sampled at tens to hundreds of kHz. The adaptive filtering approach also permits the architectures of FIGS. 3 and 4 with far less computation.

The following describes some exemplary embodiments of cascaded, adaptive beamforming systems in accordance with the present invention.

Figure 5:
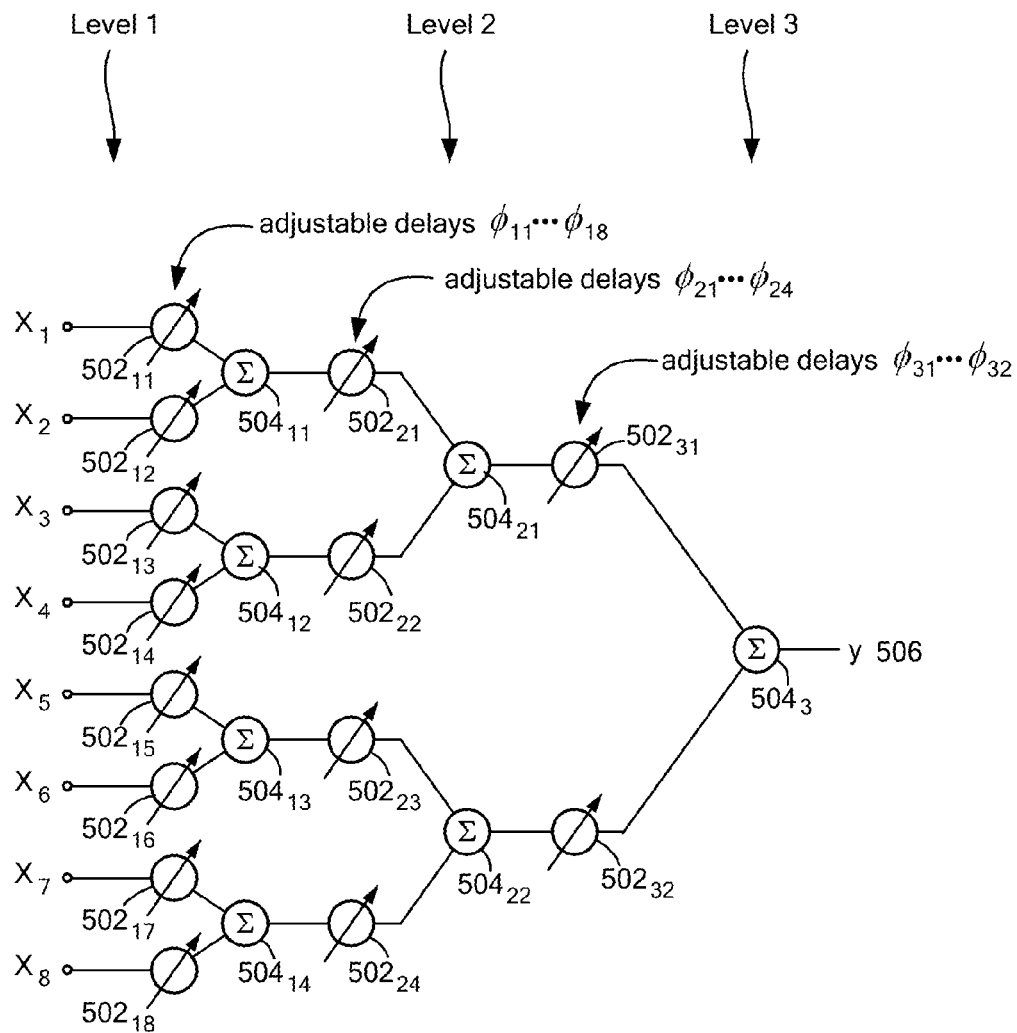
FIG. 5 is a schematic diagram showing a cascaded adaptive beamforming architecture in accordance with a first exemplary embodiment of the present invention.

FIG. 5 illustrates one cascade configuration in accordance with a first exemplary embodiment of the invention in which digitized signals $x_i$ enter the beamforming system, and pairs of receive sensor elements are beamformed, each beamforming element incorporating a means of estimating the time delay between sensor elements and producing a phase-aligned composite signal. At the next level, pairs of outputs of channel beamformers are beamformed in a similar manner (i.e., estimating a time delay between the signals and producing a phase-aligned composite signal), and so on through the final layer. Specifically, at level 1, digitized signals $X_1$ and $X_2$ are beamformed by adjustable time delay elements $502_{11}$ and $502_{12}$ and summer $504_{11}$, digitized signals $X_3$ and $X_4$ are beamformed by adjustable time delay elements $502_{13}$ and $502_{14}$ and summer $504_{12}$, digitized signals $X_5$ and $X_6$ are beamformed by adjustable time delay elements $502_{15}$ and $502_{16}$ and summer $504_{13}$, and digitized signals $X_7$ and $X_8$ are beamformed by adjustable time delay elements $502_{17}$ and $502_{18}$ and summer $504_{14}$. At level 2, the outputs of summers $504_{11}$ and $504_{12}$ are beamformed by adjustable time delay elements $502_{21}$ and $502_{22}$ and summer $504_{21}$, and the outputs of summers $504_{13}$ and $504_{14}$ are beamformed by adjustable time delay elements $502_{23}$ and $502_{24}$ and summer $504_{22}$. At level 3, the outputs of summers $504_{21}$ and $504_{22}$ are beamformed by adjustable time delay elements $502_{31}$ and $502_{32}$ and summer $504_3$ to produce beamformed signal 506. At each level, the number of computations is reduced by a factor of two from the preceding level. While eight inputs and three levels are shown in FIG. 5, this cascade configuration can be scaled to any number of inputs consistent with the resources of the computational device, e.g., 512 inputs with nine levels.

One means of delay estimation is an LMS filter or a variant of an LMS filter. Thus, the cascade configuration shown in FIG. 5 can be implemented using seven LMS filters. Any pair of sensor elements may be selected at the lowest level of FIG. 5 for estimating the delay between two signals within an LMS filter, but if the two elements are the closest physically in the array, then the shortest time delay generally exists between these elements, and thus the LMS filter length for estimating the delay between sensors is the shortest possible length. Additionally, because attenuation is minimal between signals reaching adjacent sensor elements, the true underlying transfer function between these sensors is essentially a pure delay, and a weight vector of minimal size 2 taps can estimate the delay. A long weight vector is not required to accommodate attenuation in the finite-impulse response filter model of the transfer function provided by the LMS filter.

Figure 6:
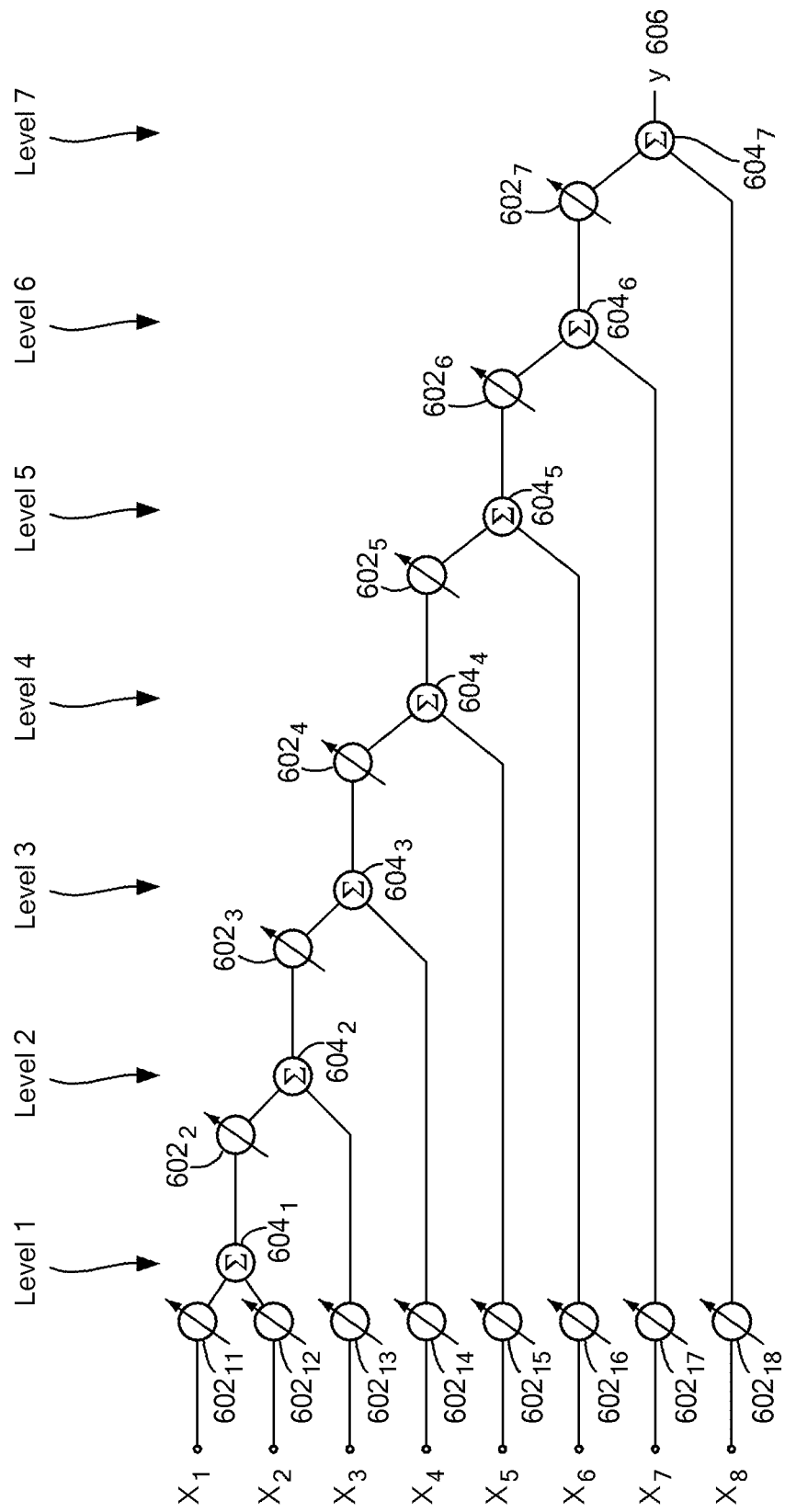
FIG. 6 is a schematic diagram showing a cascaded adaptive beamforming architecture in accordance with a second exemplary embodiment of the present invention.

In another exemplary embodiment shown in FIG. 6, the beamforming process is cascaded serially, in that a pair of transducers is beamformed, incorporating a means of estimating the time delay and phase aligning the two signals, and the output of this beamforming stage is beamformed with the next sensor and so on until the final sensor is beamformed. Specifically, at level 1, digitized signals $X_1$ and $X_2$ are beamformed by adjustable time delay elements $602_{11}$ and $602_{12}$ and summer $604_1$. At level 2, the output of summer $604_1$ and digitized signals $X_3$ are beamformed by adjustable time delay elements $602_2$ and $602_{13}$ and summer $604_2$. At level 3, the output of summer $604_2$ and digitized signals $X_4$ are beamformed by adjustable time delay elements $602_3$ and $602_{14}$ and summer $604_3$. At level 4, the output of summer $604_3$ and digitized signals $X_5$ are beamformed by adjustable time delay elements $602_4$ and $602_{15}$ and summer $604_4$. At level 5, the output of summer $604_4$ and digitized signals $X_6$ are beamformed by adjustable time delay elements $602_5$ and $602_{16}$ and summer $604_5$. At level 6, the output of summer $604_5$ and digitized signals $X_7$ are beamformed by adjustable time delay elements $602_6$ and $602_{17}$ and summer $604_6$. At level 7, the output of summer $604_6$ and digitized signals $X_8$ are beamformed by adjustable time delay elements $602_7$ and $602_{18}$ and summer $604_7$ to produce beamformed signal 606. The cascade configuration shown in FIG. 6 can be implemented using seven LMS filters. The cascade configuration shown in FIG. 6 can be scaled to any number of inputs consistent with the resources of the computational device.

Figure 7:
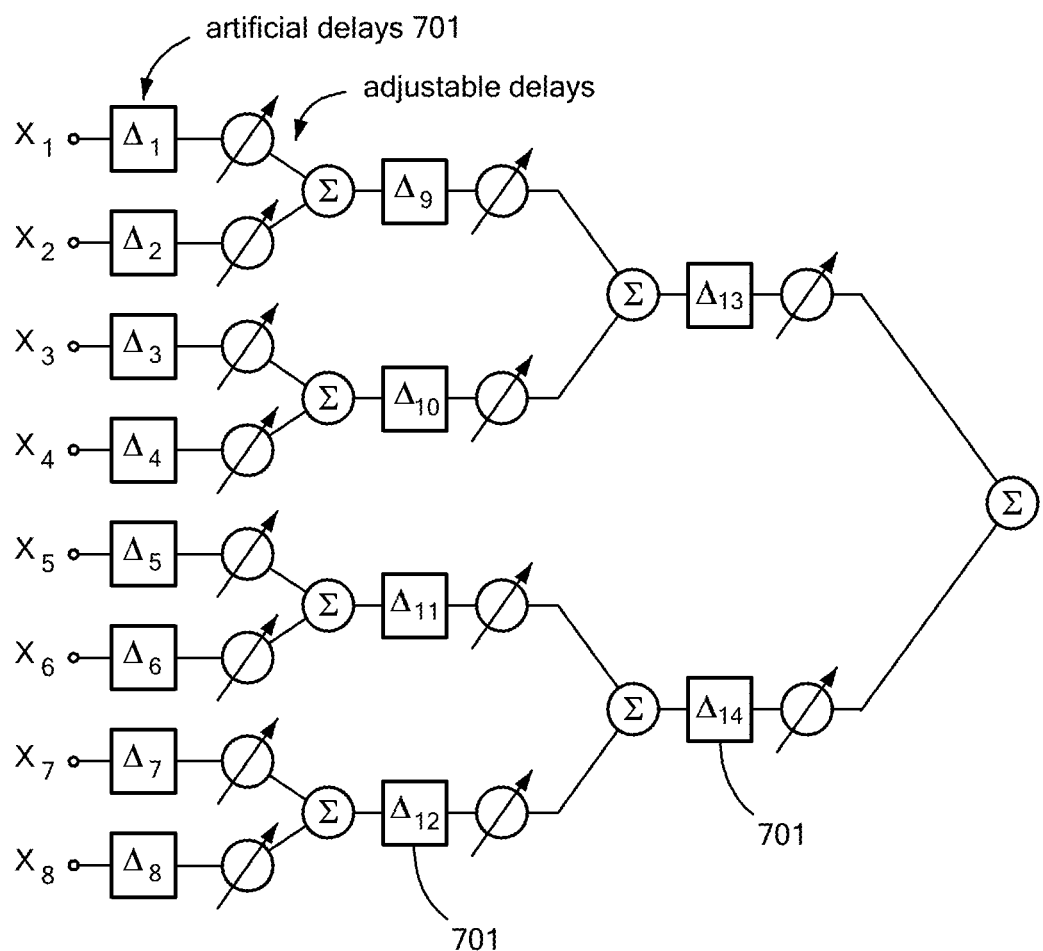
FIG. 7 is a schematic diagram showing a variant of the embodiment of FIG. 5 incorporating delay blocks, in accordance with a one alternative exemplary embodiment of the present invention.
Figure 8:
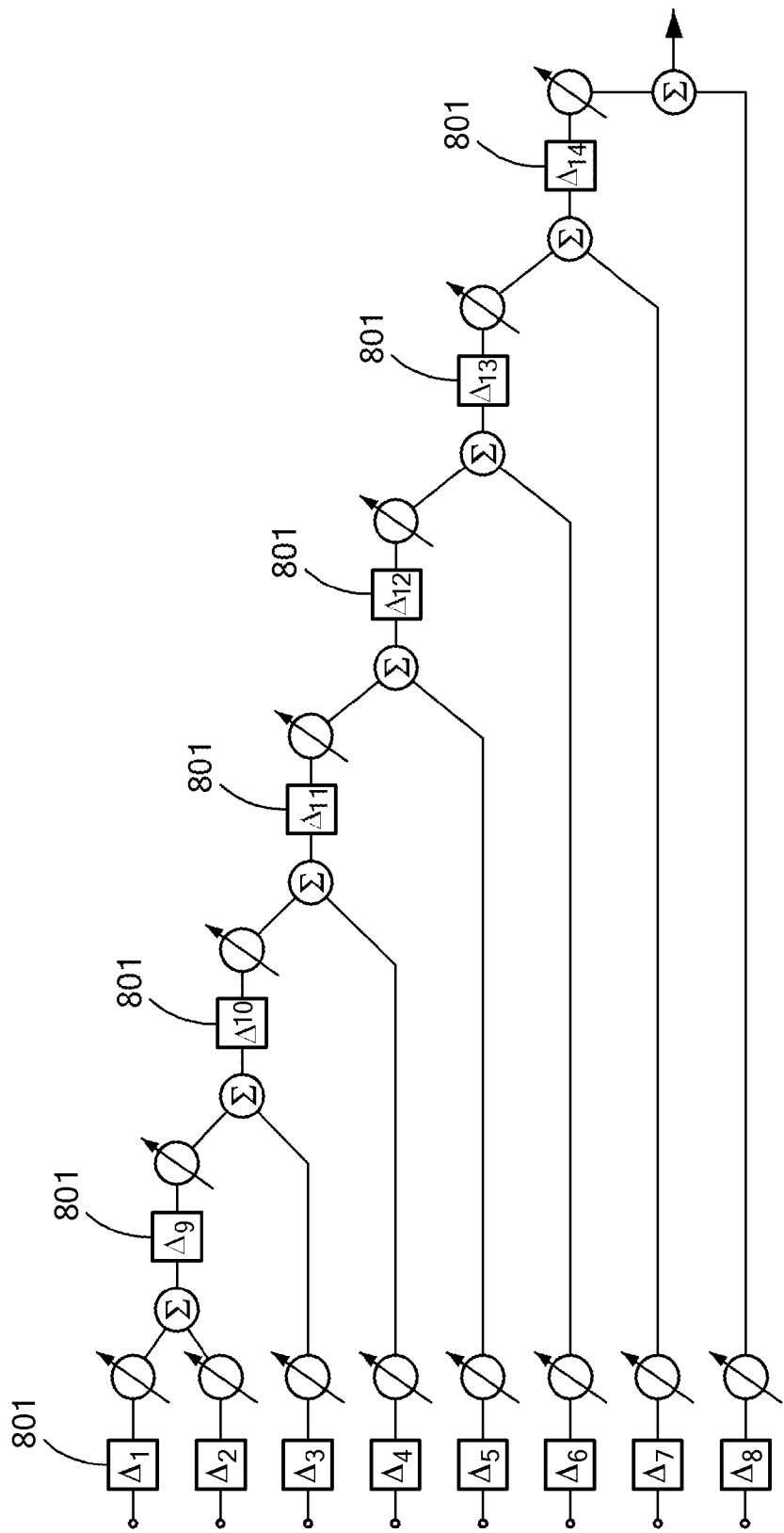
FIG. 8 is a schematic diagram showing a variant of the embodiment of FIG. 6 incorporating delay blocks, in accordance with one alternative embodiment of the present invention.

Both architectures (FIGS. 5 and 6) may include artificial delay lines inserted to enable the preceding computations to be completed prior to the next, and to accommodate the increasing time separation of beamformed signals at each level. FIG. 7 is a schematic diagram showing a variant of the embodiment of FIG. 5 incorporating delay blocks 701, in accordance with a one alternative exemplary embodiment of the present invention. FIG. 8 is a schematic diagram showing a variant of the embodiment of FIG. 6 incorporating delay blocks 801, in accordance with one alternative embodiment of the present invention.

Figure 9:
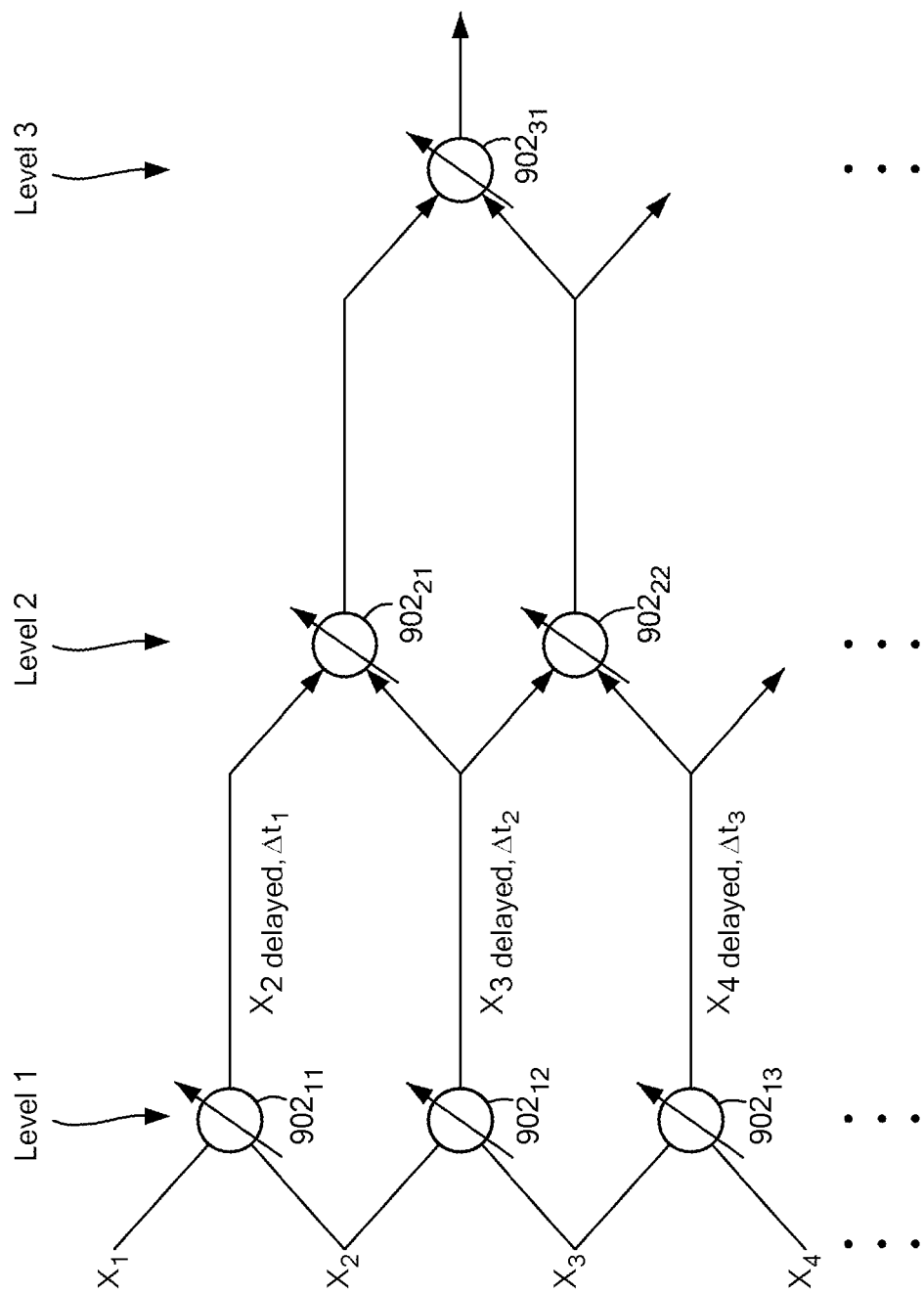
FIG. 9 is a schematic diagram showing a cascaded adaptive beamforming architecture in accordance with a third exemplary embodiment of the present invention.

FIG. 9 is a schematic diagram showing a cascaded adaptive beamforming architecture in accordance with a third exemplary embodiment of the present invention. In the partial embodiment of FIG. 9, time delays between pairs of sensors are estimated, where each delay estimation module shares a common signal input with the module adjacent to it, and the output of each delay estimation module is a delayed version of one of the signals phase-aligned with the other signal. Specifically, at level 1, digitized signals $X_1$ and $X_2$ are processed by delay estimation module $902_{11}$, digitized signals $X_2$ and $X_3$ are processed by delay estimation module $902_{12}$, digitized signals $X_3$ and $X_4$ are processed by delay estimation module $902_{13}$, and so on. At level 2, the outputs of delay estimation modules $902_{11}$ and $902_{12}$ are processed by delay estimation module $902_{21}$, the outputs of delay estimation modules $902_{12}$ and $902_{13}$ are processed by delay estimation module $902_{22}$, and so on. At level 3, the outputs of delay estimation modules $902_{21}$ and $902_{22}$ are processed by delay estimation module $902_{31}$, and so on. The time delay estimate also may be provided as an output of one or more of the delay estimation modules. In this way, time delays are estimated between channels 1 and 2, 2 and 3, 3 and 4, and so on. For an N channel system, N−1 delay estimators, such as the LMS filter described above, are required. FIG. 9 illustrates the concept for 4 channels, although this can be scaled to any number of channels consistent with the resources of the computational device. Because channel 1 is aligned with channel 2, channel 2 with 3, and so on, the summed outputs of each pair are readily summed to beamform all signals, either by a cascaded or sequential computation as in FIGS. 7 and 8.

In various alternative embodiments, any combination of distributed serial and parallel beamforming may be implemented so as to benefit from the positive aspects of the embodiments in FIGS. 5-9.

Using any one of the embodiments of FIGS. 5-9, it is possible to incorporate either a real-time computing architecture for pipelining the signals through the signal processing paths, or an all-software embodiment, or some combination. In a real-time computing architecture, the use of FIFO buffers and parallel signal processing paths for pipelining data through adaptive filters for time delay estimation and for beamforming eliminates a substantial component of the data management problem that exists for systems with high throughput and a large number of channels. With a real-time computing architecture, data from individual sensors do not need to be stored in memory and do not require external electronic elements, such as a DMA controller or graphical processing unit, to manage the data. In exemplary embodiments, only the beamformed signal (e.g., coherent beamformed signals that correspond to the final output of the cascaded architecture) is retained for further processing or display.

Figure 10:
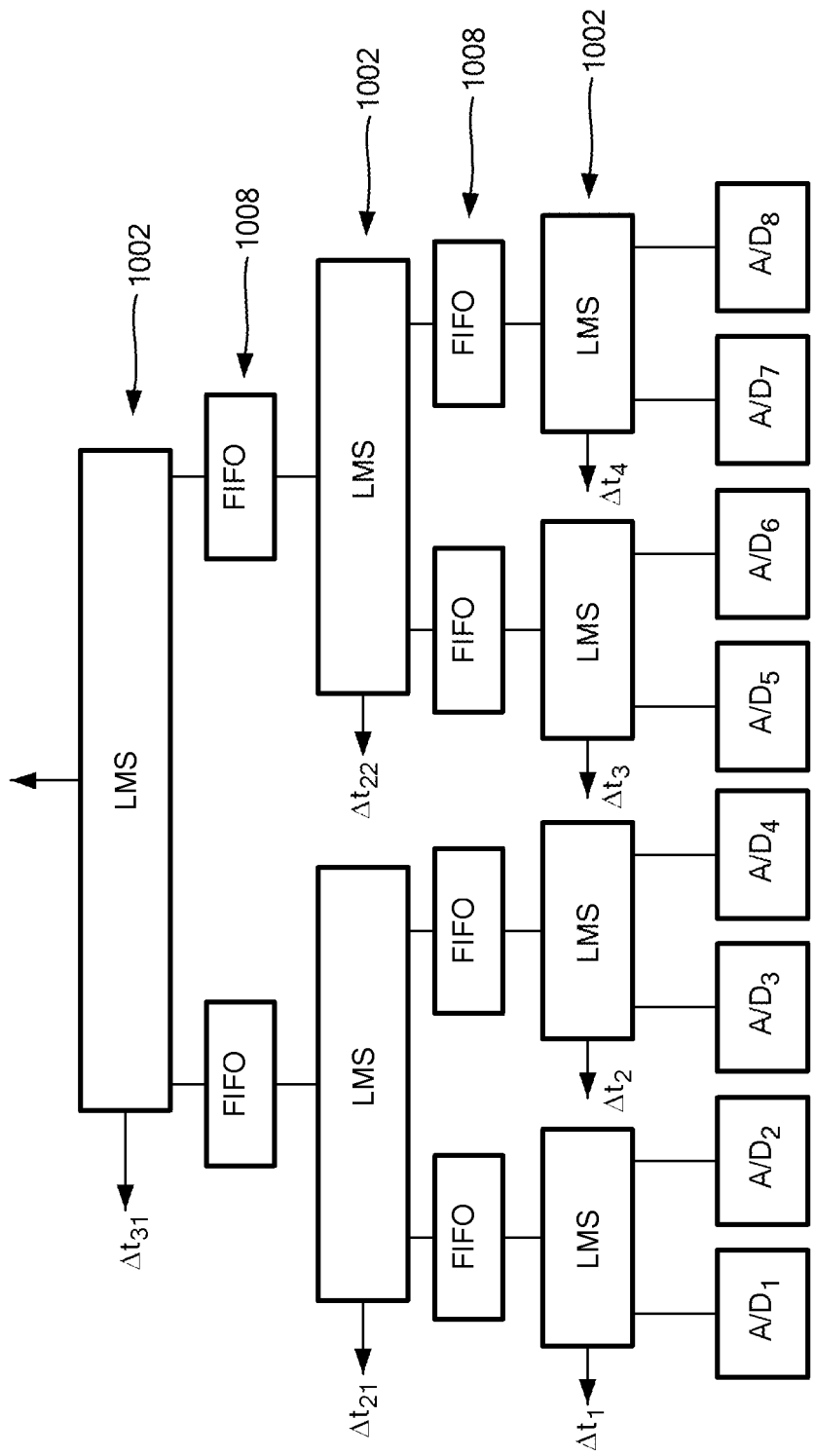
FIG. 10 shows an exemplary embodiment of the cascaded adaptive beamforming architecture of FIG. 5 incorporating LMS filters 1002 and FIFO buffers 1008 for phase alignment of signals and delay estimation.

As discussed above, one means of phase aligning signals and estimating time delays is use of an adaptive filter, for example, a least-mean square (LMS) filter or a variant of an LMS filter. FIG. 10 shows an exemplary embodiment of the cascaded adaptive beamforming architecture of FIG. 5 incorporating LMS filters 1002 for phase alignment of signals and delay estimation. This exemplary embodiment also includes delay blocks in the form of FIFO buffers 1008 (discussed further below). Here, the LMS filter takes in two signals and estimates the delay between the signals using an adaptive FIR filter, where weights of the filter are adapted using an LMS algorithm or a variant of an LMS filter. Such a filter can be used in any of the embodiments of FIGS. 5-9 to estimate the delay between any two signals. Each LMS filter 1002 at the lowest level of FIG. 10 has a length of at least L=2. The number of computations per sample (multiply-accumulate operations or MACS) for a basic LMS filter is 2L+1. Thus, for M channels, assuming L=2 for all filters in the tree, adaptive beamforming uses (M−1)(2L+1) MACS per sample with the cascaded architecture.

Figure 11:
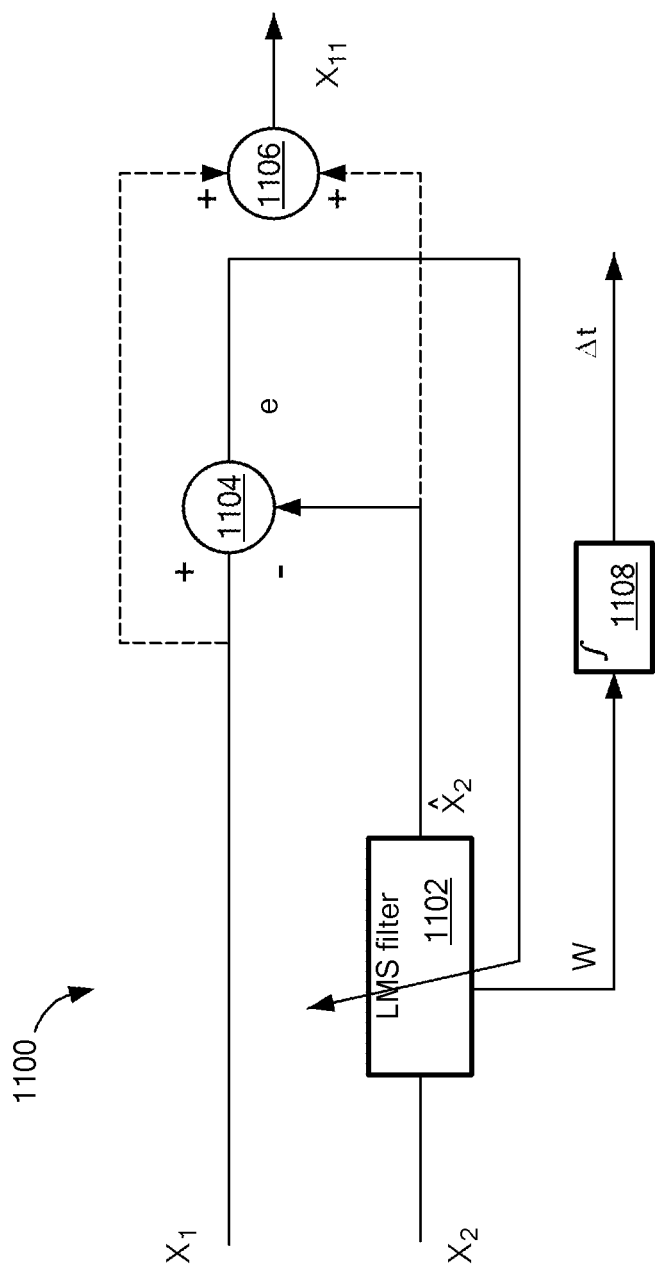
FIG. 11 shows one exemplary embodiment of an LMS filter for delay estimation.

FIG. 11 shows one exemplary embodiment of an LMS filter circuit 1100 for delay estimation in any of the embodiments described with reference to FIGS. 5-10. The output(s) of the LMS filter circuit 1100 can include the time delay estimate $\Delta t$, the phase-aligned signals from the two input channels $X_{11}$, and/or the adaptive filter weights of the adaptive LMS filter 1102. In particular, the adaptive LMS filter circuit 1100 estimates the delay between the two input signals $X_1$ and $X_2$, where $X_1$ is a vector containing samples of a signal recorded from a first sensor within the sensor array, and $X_2$ is a vector containing samples of a signal from a second sensor of the sensor array and with unknown delay $\Delta t$ between the arrival of the sensed signal at the first sensor and the arrival of the sensed signal at the second sensor. These vectors are of length N. The adaptive LMS filter 1102 models the delay as a finite impulse response filter of length N, with the output of the filter $\hat{X}_2$ being an estimate of the signal $X_2$ given by $\hat{X}_2 = W^T X_2$, where W is a weight vector estimated adaptively based on the signal $X_2$ and (via block 1104) the signal $X_1$, using a least-mean-squared (LMS) adaptive filter or one of its variants. The index associated with the maximum value of W times the sample time provides an estimate of $\Delta t$. The phase-aligned output $X_{11}$ is a combination of the input $X_1$ and the output of the adaptive LMS filter $\hat{X}_2$ as represented by the dashed lines to block 1106. In addition to, or in lieu of, producing the phase-aligned output $X_{11}$, the LMS filter circuit 1100 may output the weight vector W and/or the estimated time delay $\Delta t$ (via block 1108).

Within any of these embodiments, it is desirable to ensure as small a filter length as possible, e.g., to permit the beamforming computations to be performed in real-time or near real-time and/or to allow for a larger number of filters to be implemented on a given computation device. In medical ultrasound, transducer spacing is generally small— on the order of one or two multiples of a wavelength or less—and thus the signal delay between any two adjacent elements is small. For example, if transducer elements are spaced one wavelength apart for a 10 MHz probe (0.15 mm), and the focus point is 50 mm from the first element of the probe array, the delay between an echo being received by the first two adjacent elements can be as small as 1.46e-10 sec and for the last two elements in the array, the delay between adjacent elements can be as large as 6.88e-8 sec. For a sample frequency of 100 MHz, these delays correspond to a fraction of a sample time to 6.88 times the sample time, so that that estimation of these delays can be made using LMS filters with very short filter lengths. Signals from two closely spaced sensor elements generally exhibit the largest coherence, improving convergence of the LMS filter in phase aligning; thus, while two elements spaced far apart may have raw signals that have poor coherence, the improvement in signal-to-noise ratio for each signal pair and corresponding improvement in coherence improves the ability to phase align signals as one moves through each level of the cascaded architectures of FIGS. 5-8. For the embodiment of FIG. 9, where delays are estimated between channels 1 and 2, 2 and 3, and so on, the high signal coherence of adjacent signals is preserved, and each of the LMS filter lengths remains small. In the cascaded architecture of FIG. 10, FIFO buffers of adjustable length are used on the output of each LMS filter to adjust for additional delays between the outputs of beamforming of sensor pairs also allowing the filter lengths to remain small.

Thus, in exemplary embodiments, pairs of adjacent signals are typically beamformed at each level.

For example, in a 1D array having array elements arranged as follows:

A B C D E F . . .

an implementation of FIG. 5 might beamform elements A/B, elements C/D, elements, E/F, etc. or an implementation of FIG. 9 might beamform elements A/B, elements B/C, elements C/D, elements D/E, elements E/F, etc.

For a 2D array having array elements arranged as follows:

A B C . . .
D E F . . .
G H I . . .

many configurations are possible depending on direction of the scan line. For example, one implementation of FIG. 9 might beamform elements horizontally, e.g., beamform elements A/B, elements B/C, elements D/E, elements E/F, elements G/H, and elements H/I; another implementation of FIG. 9 might beamform elements vertically, e.g., beamform elements A/D, elements D/G, elements B/E, elements E/H, elements C/F, and elements F/I; and yet another implementation of FIG. 9 might beamform elements diagonally, e.g., beamform elements A/E and elements E/I. Implementations may be configured to beamform in multiple directions, e.g., with respect to a given focus point, the array may be made to perform scans horizontally, vertically, and/or diagonally and process the resulting data to improve resolution. For example, the scanner may include switches to allow different combinations of signals to be beamformed at each level.

Of course, array elements could be arranged in other configurations (e.g., concentrically). The present invention is not limited to any particular array size or configuration.

Various exemplary embodiments use an LMS filter architecture with very short FIR filters—as short as length 2—to accommodate delays that are not an integer multiple of the sample time. Importantly, the delay itself can be used to beamform the signals, or the signals can be simply aligned at the output of the LMS filter as a result of the filtering process. The output of the filter comprises a phase-aligned signal with increased SNR over the two input signals. The estimated delay also can be used to phase-align the original signals. The estimated delay can be obtained through further processing of the converged LMS filter weight vector.

Figure 12:
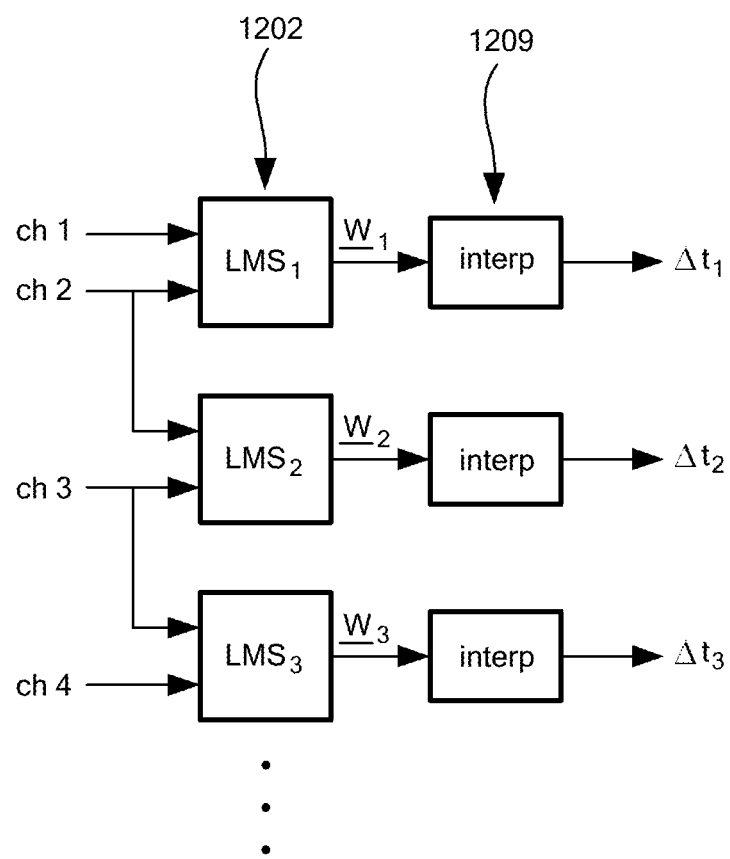
FIG. 12 shows a variant of the cascaded adaptive beamforming architecture of FIG. 9 incorporating upsampling and interpolation of the weight vector to estimate delays that are not integer multiples of the sample time and interpolation of channel signals before beamforming, in accordance with certain exemplary embodiments of the present invention.

In order to estimate the time delay from the weight vector, in certain exemplary embodiments, the weight vector is upsampled and interpolated to estimate the index of the maximum of the weight vector, which corresponds to the delay. FIG. 12 shows a variant of the cascaded adaptive beamforming architecture of FIG. 9 incorporating upsampling and interpolation of the weight vector to estimate delays that are not integer multiples of the sample time and interpolation of channel signals before beamforming, in accordance with certain exemplary embodiments of the present invention. In FIG. 12, the output of each LMS filter 1202 is a weight vector. An upsampling and interpolation block 1209 takes the weight vector from the LMS filter 1202 and provides a delay estimate between the two channels. The corresponding channel data also can be upsampled prior to beamforming to permit phase shifting by non-integer multiples of the sample time. Thus, the estimated time delay is available to phase-align signals. Either the estimated delays or filter weights can be used to beamform the signal for the location of focus and the estimated time delays can provide additional clinical information related to tissue properties or speed of sound along the beam path. The output of the upsampling and interpolation block 1209 may be fed to a FIFO block or comparator. It should be noted that upsampling and interpolation blocks also can be added to architectures of the types shown in FIGS. 5-8, in a manner similar to that described with reference to FIG. 9.

In order to perform these computations within a real-time computing architecture without the need to store channel data in memory, a real-time processor in which inherently parallel signal paths can be constructed, such as an FPGA, Graphical processing unit (GPU), or special-purpose ASIC device, can be used to embody the adaptive cascaded architecture. Insertion of delay taps within embodiments (e.g., as shown in FIGS. 7 and 8) enables alignment of the computations without violating causality or constraints imposed by the computational device and minimizes the need to store or retrieve transducer signals in memory. For example, a Xilinx Virtex 7 Field-Programmable Gate Array (FPGA) available from Xilinx Inc. clocked at 200 MHz has 2800 digital signal processing (DSP) slices to implement multiply-accumulate operations at up to 3× the clock speed of the processor, so computationally, the signal processing architecture can fit on one processor for a large number of channels. However, each subsequent level in the distributed parallel embodiment of FIGS. 5 and 6 incurs a larger delay between samples. This delay can be accommodated by either 1) a longer filter, or 2) a delay line in specified signal processing paths inserted, for example, using a FIFO buffer when the total delay exceeds the sample time. Longer FIR filters have the disadvantage of increasing the number of multiply-accumulate computations that need to be performed per second (MACS), while FIFO delays present a bookkeeping approach, as the delay is a function of focus point and sensor element location relative to the scan point. Even if the filter length is doubled for each filter at each subsequent level, a 512 channel beamformer (10 levels) requires 0.92 TMACS ($0.92 \times 10^{12}$) multiply-accumulate operations per second. Current technology FPGA devices are capable of over 5× this throughput.

FPGA devices have a sufficient number of Low-Voltage Differential Signaling (LVDS) input-output lines to digitize hundreds of input signals from high-speed A/D converters. The Xilinx Virtex 7 has 1200 high-speed I/O lines. For 80 MHz throughput, two lines per channel (plus some control lines) are needed for analog-to-digital conversion; hence, a single processor can accommodate 512 channels at 80 MHz. The multiply-accumulate registers on these devices permit 25×18-bit wide multiplies with 40-bit wide accumulate registers. The digitized signal from an A/D converter will be ≤14-bits, permitting a 25 bit wide weight vector within each LMS filter. Weight vector element magnitude is always less than one in the embodiments described in FIGS. 5-9. Hence, finite precision effects and overflow checking is avoided in time delay estimation.

Figure 13:
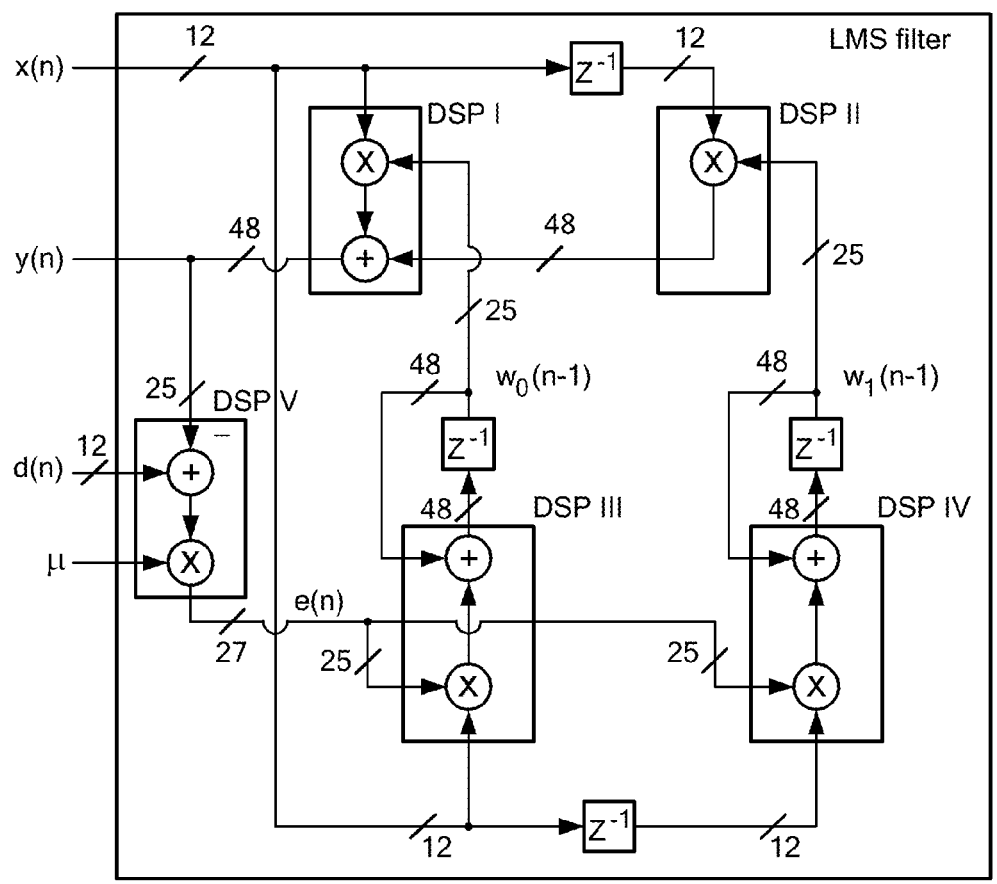
FIGS. 13-15 show variants of a two-channel LMS filter implemented for very high throughput using DSP slices on an FPGA, in accordance with various alternative embodiments of the present invention.
Figure 14:
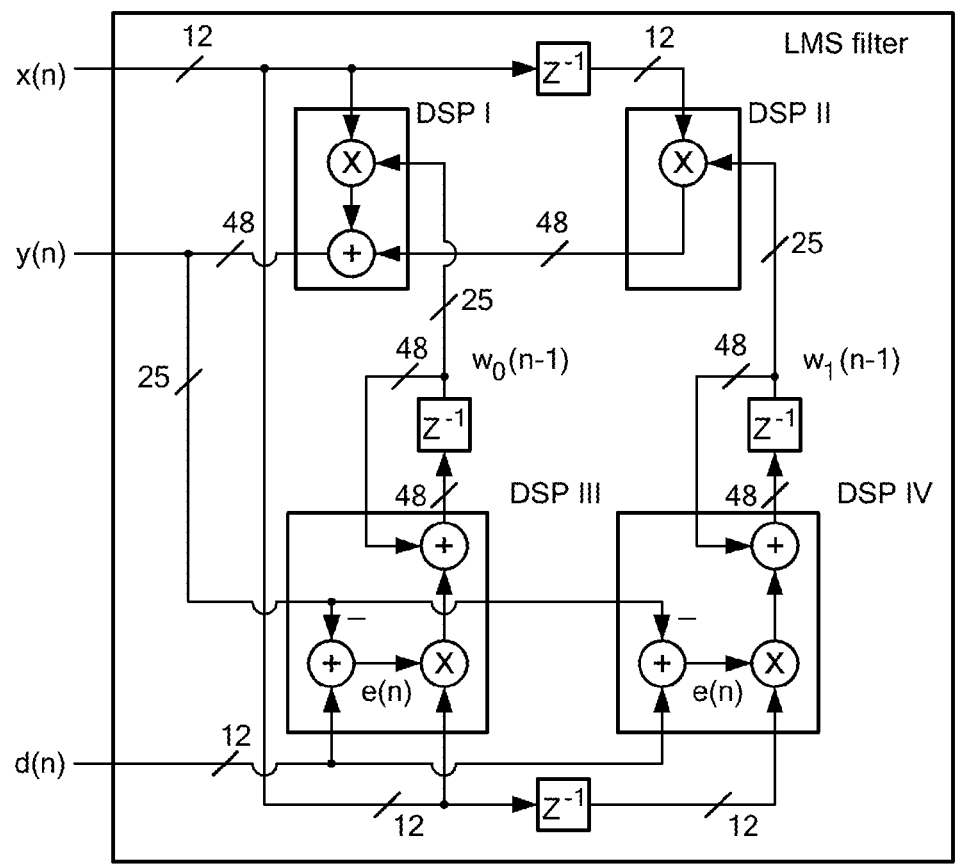
Figure 15:
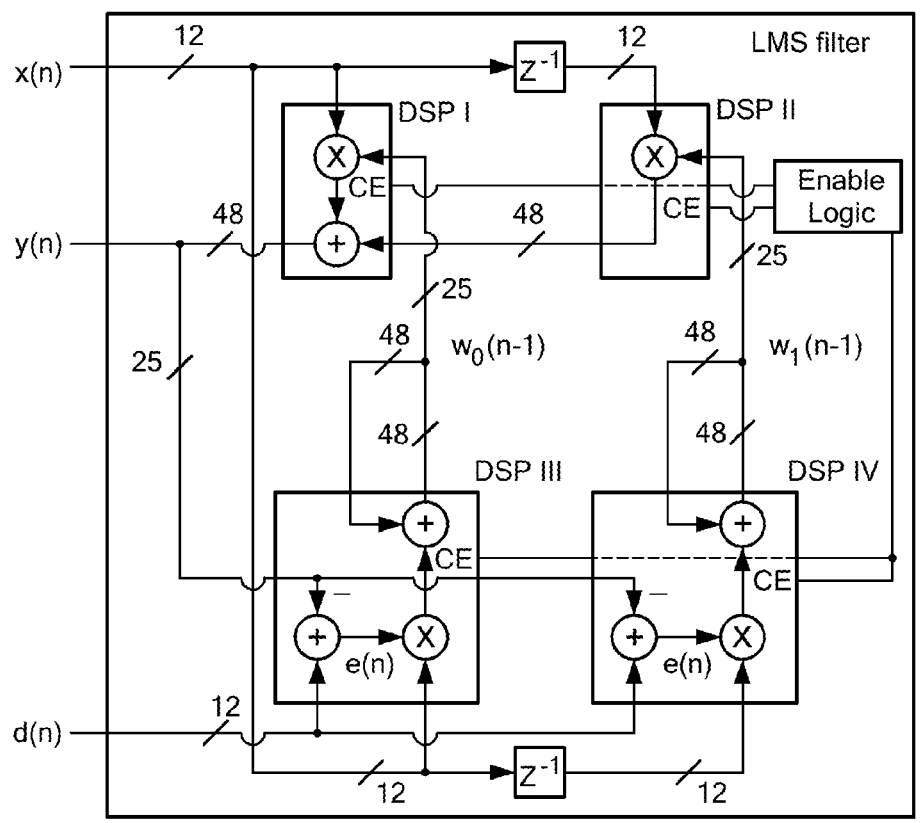

Pipelines can be created using a combination of DSP slices (operating at a multiple of the FPGA clock speed) and FIFO buffers to permit synchronous computation through each beamforming channel. A non-canonical LMS filter (see, e.g., Gan W, Soraghan J, Stewart R, Durrani T, The Non-Canonical LMS Algorithm: Characteristics and Analysis, The non-canonical LMS algorithm (NCLMS): characteristics and analysis, IEEE Conference on Acoustics, Speech, and Signal Processing, 3, 2137-2140, 1991) may be employed to reduce the number of MACS per filter from 5 to 3 and to simplify the process of extracting the delay value from the filter. FIGS. 13-15 show exemplary embodiments of an LMS filter for two channels as it might be instantiated using DSP slices and replicated for each pair of channels beamformed. The exemplary embodiment of FIG. 13 incorporates 5 DSP slices for performing the LMS computations, while the exemplary embodiment of FIG. 14 reduces this to four slices by using an LMS step size of one, and the exemplary embodiment in FIG. 15 eliminates the delay blocks.

In medical ultrasound, an image is generally created through multiple transmit and receive functions, each providing a line of the image. By establishing a grid of focus points and introducing appropriate transmit delays to focus on a single point at a time, individual lines of the image are created. Each LMS filter takes in two signals—a reference signal (e.g., X1 in FIG. 11) and a delayed reference signal (e.g., X2 in FIG. 11). It is important to know which of two signals received at a pair of elements is the delayed or later-arriving signal, because if signals are reversed in the LMS filter, causality is violated, and the delay will not be correctly estimated. Generally speaking, geometry dictates which of a pair of channel signals arrives earliest, based on the location of the channel pair relative to the center of an array. Thus, geometry can be used to preserve causality in an LMS filter. Alternatively, the computation of delay based on geometry and speed-of-sound allows determination of which of the pair of channel signals arrived earliest, e.g., based on the sign of the delay between these channel pairs as calculated based on geometry. Alternatively, when the local tissue properties reverse the order of arrival of signals, two LMS filters can be implemented, each considering one of the two orders of arrival, and the filter whose time delay estimate is nearest to that predicted from geometry is selected as the time delay estimate for that pair of channels.

Besides a real-time computing architecture, various alternative embodiments of cascaded adaptive beamforming can also be implemented through software running on a single core, GPU, or multi-core computing device, if signals can be stored and accessed from memory. For example, a Graphics Processing Unit (GPU) permits parallelization of LMS filter computations via distribution of filters to CUDAs permitting all of the embodiments in FIGS. 5-12 to be performed on a GPU workstation. With a memory bandwidth of 208 GB/sec and single point precision of 3.52 TFlops, the NVIDIA Tesla K20 has more than twice the memory bandwidth and more than 5× the computational throughput to process filters of length 10 in parallel for a 192 channel system. In such an embodiment, excess computational resources can be used to upsample the weight vector in order to estimate fractional delays and also to upsample two individual channel signals so as to be able phase shifting by a fractional time delay as described above, further improving phase alignment of signals.

Figure 16:
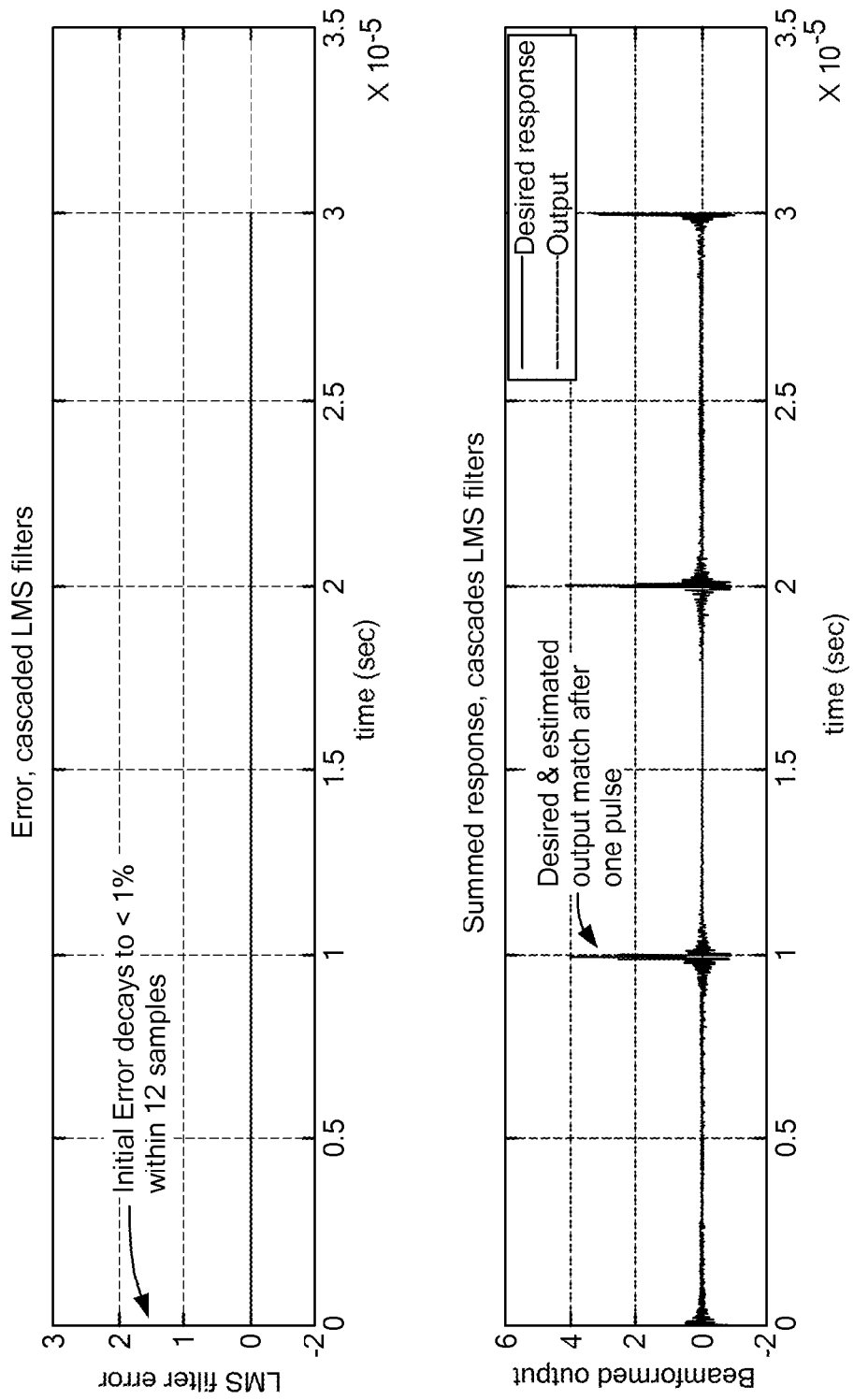
FIG. 16 shows example results of phase alignment of signals and LMS filter convergence properties for a four-element array, in accordance with one specific exemplary embodiment of the present invention.

FIG. 16 shows an example of LMS filter convergence for a three-level filter (four channels) for a sequence of pulses of SPL~2 cycles and LMS filters of length two. Finite precision effects for 12-bit A/D converters are included. Results show excellent ability to synchronize signals for beamforming, reducing error to under 1% after 12 samples and to negligible levels in three pulse cycles (the desired response and output are virtually indistinguishable). Table 1 summarizes delay estimation results for 3 pulses (3×10−5 sec scan time per point) and 10 pulses (1e-4 sec per point).

TABLE 1

Example delay estimation results

| | $\Delta t_1$ | $\Delta t_2$ | $\Delta t_{21}$ |
|---|---|---|---|
| True delay (T is sample time) | 0.07 T | 0.03 T | 0.17 T |
| Delay estimate after 3e-5 s (3 pulses) | 0.07 T | 0.044 T | 0.186 T |
| Delay estimate after 1e-4 s (10 pulses) | 0.071 T | 0.032 T | 0.16 T |

These evaluations show adequate filter convergence from LMS weight filters vector initialized as [0 0] (i.e., assuming no a priori estimate of delay), and time delay estimation error after ten cycles of 1.4-5.9%. Assuming voxel sizes of 0.5×0.5×0.5 mm³ and tissue volume of 6×10×10 cm³, the number of "look" points in an image is ~5×10⁶. For 3-pulse convergence, the scan time is ~2.5 minutes, and for 10 pulse convergence, scan time is ~8.5 minutes. Scan time can be reduced by reducing time between pulses, assuming sufficient damping material behind the probe.

The estimated time delays provided by an LMS filter also can be used to improve focus of the transmit energy on the location of interest, avoiding reflections from other scatterers, minimizing impact of speed-of-sound uncertainty, and reducing the point spread. Using estimated time delays to transmit a focused signal provides a feedback loop within the focus function. As an illustration of effects of speed-of-sound, consider a two-channel beamformer separated by a distance of 0.15 mm focusing on a location 5 cm axially from one sensor. A 10% speed-of-sound uncertainty results in approximately 10% uncertainty in the phase alignment location and energy is focused on a location 4.54 cm from the desired location (an error of around 5 mm). Misalignment of transmit and receive energy focus location further degrades resolution achieved. Thus, using the estimated time delays or LMS filter weights to focus transmit energy should contribute to reduction in the PSF of the beam and improved SNR. To the best of the inventors' knowledge, incorporating such feedback into electronic focusing in ultrasound imaging has not yet been attempted.

When used within a medical ultrasound system, the distributed adaptive beamforming architectures described above can be used to estimate time-space varying delays from reflections that occur from multiple reflectors along a scan line. When multiple reflectors exist along a scan line, a single time delay between channels does not appropriately characterize the delay for reflections from points along the scan line. In traditional beamforming, a transducer is said to have a focal length because of this, where the focal length is the length along the line of focus where the geometric time delay allows the tissue image in that region to be in focus. Outside of the focal length, the geometric time delay is an error causing blurring of the image. When LMS filtering is applied to the time series data from the full scan line, different time domains of convergence of the weight vector occur as reflections from different locations along the line are evident in the data. Alternatively, by windowing the data in sections around the focus point, e.g., with a rectangular or Hanning or Hamming or other window, multiple time delays along the scan line, each corresponding to a single window of data, can be estimated, such that a time-dependent delay along the scan line corresponding to a distant-dependent delay along the scan line is estimated. When the windows are adjusted based on the focal distance of the transducer, estimated time delays correspond only to the signals at and in proximity to the focal distance, permitting fine adjustment of time delays based on the focus point. Since the short filters converge rapidly, very little time series data are required for the filters associated with each window to converge, and each window of data can then be beamformed using these window-dependent delay estimates.

Figure 17:
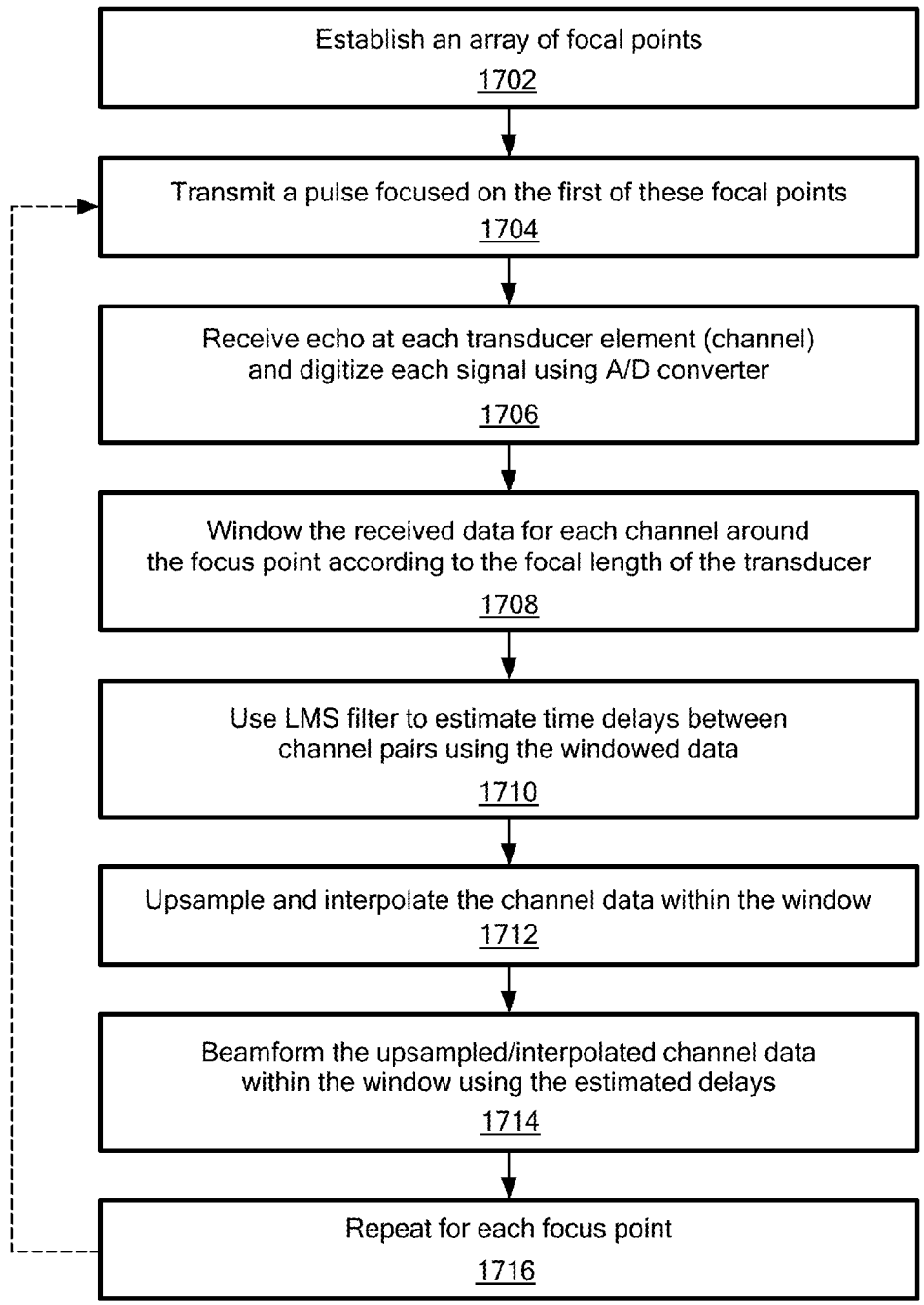
FIG. 17 is a logic flow diagram for cascaded adaptive beamforming with windowing, in accordance with one exemplary embodiment.
Figure 18A:
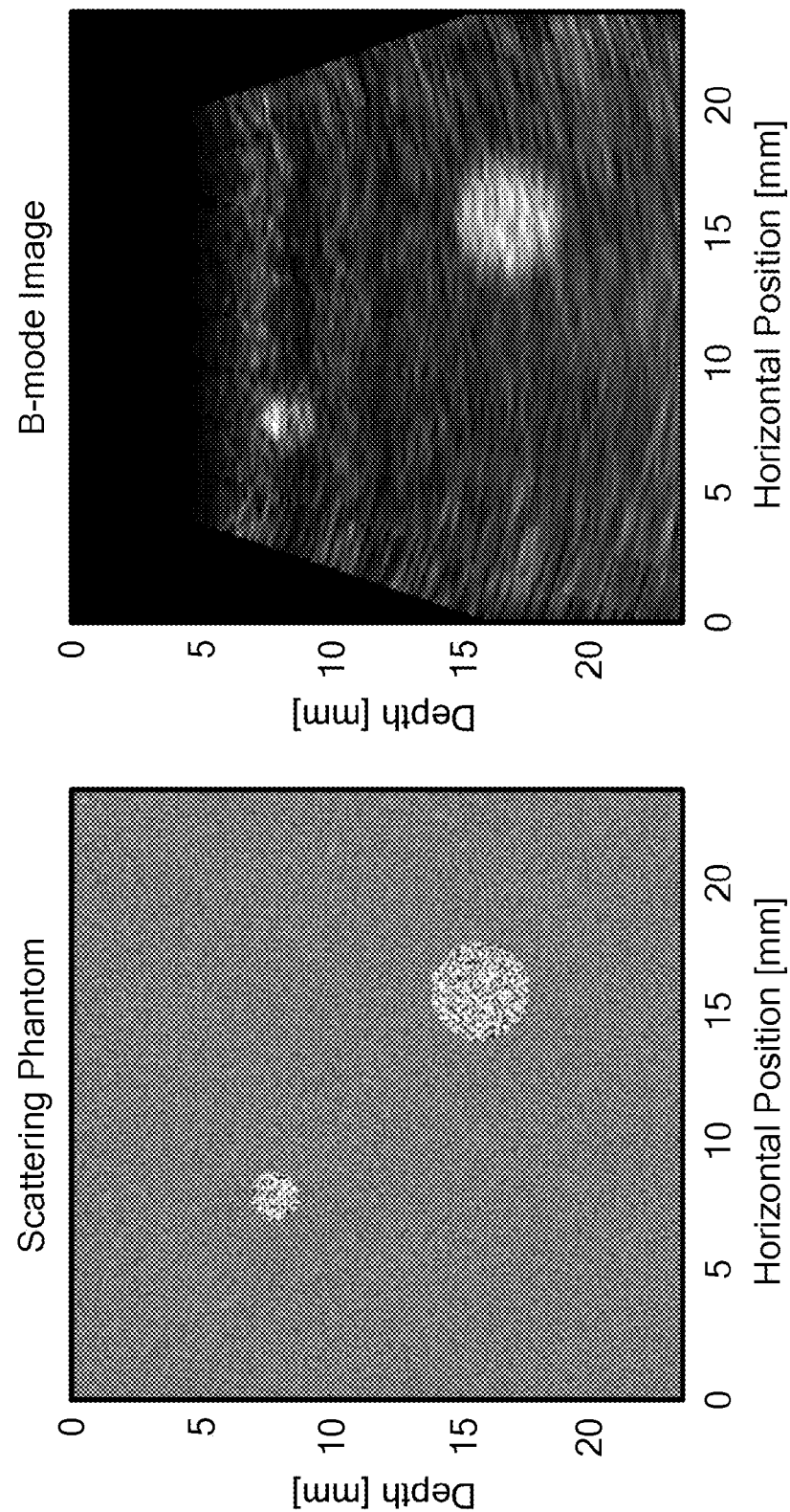
FIGS. 18A and 18B show an example of contrast improvement through cascaded beamforming using the architecture of FIG. 12, in accordance with one exemplary embodiment.
Figure 18B:
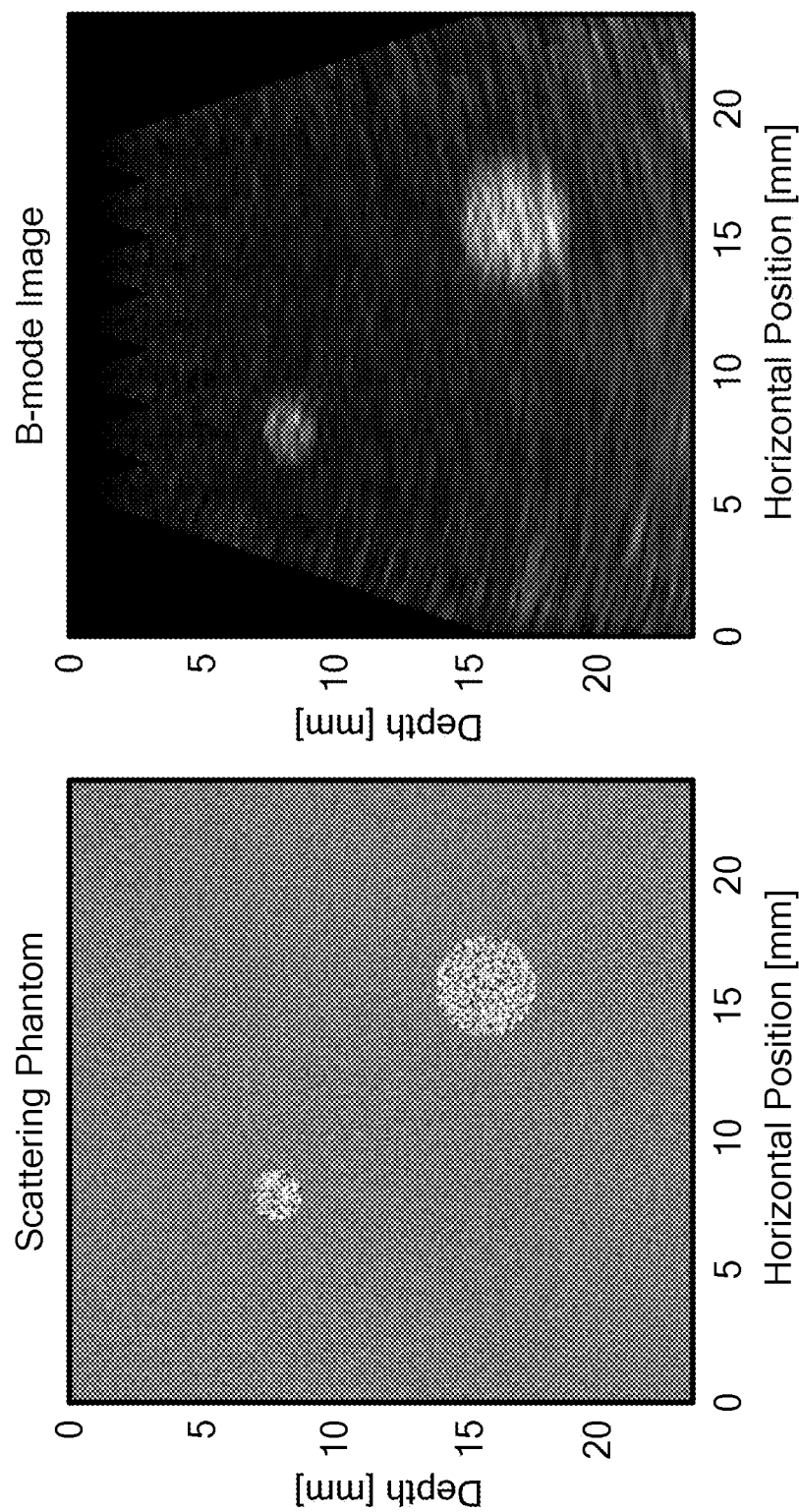

FIG. 17 provides a flow chart of an exemplary computational algorithm for cascaded adaptive beamforming incorporating time delay estimation, windowing, and upsampling before beamforming. In step 1702, establish an array of focal points. In step 1704, transmit a pulse focused on the first of these focal points. In step 1706, receive echo at each transducer element (channel) and digitize each signal using A/D converter. In step 1708, window the received data for each channel around the focus point according to the focal length of the transducer. In step 1710, use LMS filter to estimate time delays between channel pairs using the windowed data. In step 1712, upsample and interpolate the channel data within the window. In step 1714, beamform the upsampled/interpolated channel data within the window using the estimated delays. In step 1716, repeat steps 1704-1714 for each focus point. FIGS. 18A and 18B show an example of contrast improvement derived from this system for a simulated phantom comprised of two discs with Gaussian density and speed-of-sound distributions within a medium having a different Gaussian density and speed-of-sound distributions, where FIG. 18A shows an example of traditional beamforming with delays determined based on geometry and fixed speed-of-sound, and FIG. 18B shows an example of contrast improvement using LMS beamforming with estimated delays between channels.

Although the description provided herein focuses primarily on beamforming with arrays receiving signals from sensors such as antennas, microphones, or ultrasonic transducers, principles described herein for cascaded, adaptive processing apply also to transmission of a beamformed signal from an array of transmitters, such as antennas, ultrasonic transducers, or speakers. For transmission of a beamformed signal, appropriate delays are added to one or more signals in order to focus the aggregate beamformed signal on a single point. The delay(s) added to the signal(s) can be based on the delays measured from earlier received signals. For example, as discussed above, the estimated time delays provided by an LMS filter can be used to improve focus of the transmit energy on the location of interest, avoiding reflections from other scatterers, minimizing impact of speed-of-sound uncertainty, and reducing the point spread. Using estimated time delays to transmit a focused signal provides a feedback loop within the focus function.

Thus, in exemplary embodiments of the present invention, a cascaded adaptive beamforming system comprises a plurality of elements configured to receive signals and a signal processor (e.g., an appropriate configured FPGA, ASIC, GPU, or other processor element or elements) configured to process the received signals, the signal processor having a cascade architecture, wherein at each of a plurality of cascade levels, at least one pair of signals is beamformed, such beamforming comprising phase-alignment of the pair of signals and outputting a phase-aligned composite signal to the next successive cascade level. In various alternative embodiments, the signal processor may have an architecture substantially as shown and described with reference to FIG. 5, FIG. 6, FIG. 7, FIG. 8, FIG. 9, or FIG. 10. In any of such embodiments, phase-alignment of the signals may be based on a time delay estimation (where the time delay estimation may be provided as an output for a use other than beamforming of the signals) or may be based on an LMS filter (which may have a filter length as short as 2). An LMS filter may have an architecture substantially as shown and described with reference to FIG. 11. In any of these embodiments, beamforming may further comprise upsampling and interpolation of the signals to allow for phase-alignment of the signals where the time delay between the signals is less than one sample time. In any of these embodiments, the plurality of elements may be further configured to transmit signals, and the signal processor may be configured to produce the transmit signals using estimated time delays or filter weights from beamforming of the received signals.

It should be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

Thus, the present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A cascaded adaptive beamforming system comprising:
   a plurality of sensors configured to receive signals and to produce corresponding sensor output signals; and
   a beamforming processor configured to process the sensor output signals to produce a beamformed output signal, the beamforming processor having a cascade arrangement with a first cascade level and a plurality of succeeding cascade levels, the first cascade level and each succeeding cascade level including a beamforming element configured to perform beamforming on two input signals to produce a phase-aligned composite signal, each beamforming element including (i) a filter structured to estimate time delay between the two input signals and adaptively phase-align the two input signals, and (ii) a summer for combining the two input signals, after correction for the time delay by the filter, to produce the phase-aligned composite signal.

2. A cascaded adaptive beamforming system according to claim 1, wherein the phase-aligned composite signal is sum of (a) a delayed version of a first one of the two input signals phase-aligned with a second one of the two input signals and (b) the second one of the two input signals.

3. A cascaded adaptive beamforming system according to claim 1, wherein, for each beamforming element, the beamforming processor is configured to perform a time delay estimation based on the two input signals and to produce the phase-aligned composite signal based on the time delay estimation.

4. A cascaded adaptive beamforming system according to claim 3, wherein the beamforming processor is further configured to output the time delay estimation for a use other than beamforming of the signals.

5. A cascaded adaptive beamforming system according to claim 1, wherein, for each beamforming element, the beamforming processor is configured to implement an adaptive filter for at least one of (1) outputting a time delay estimation based on the two input signals, (2) outputting the phase-aligned composite signal, or (3) outputting adaptive filter weights of the adaptive filter.

6. A cascaded adaptive beamforming system according to claim 5, wherein each adaptive filter is an LMS filter.

7. A cascaded adaptive beamforming system according to claim 6, wherein each LMS filter has length 2.

8. A cascaded adaptive beamforming system according to claim 1, wherein, for each beamforming element, the beamforming processor is configured to implement a first adjustable time delay element for adding an adjustable amount of delay to a first input signal of the two input signals, a second adjustable time delay element for adding an adjustable amount of delay to a second input signal of the two input signals, and a summer configured to combine the outputs of the first and second adjustable time delay elements to produce the phase-aligned composite signal.

9. A cascaded adaptive beamforming system according to claim 1, wherein, for each beamforming element, the beamforming processor is configured to perform upsampling and interpolation on each of the two input signals to allow for phasealignment of the signals when the time delay between the two input signals is less than one sample time.

10. A cascaded adaptive beamforming system according to claim 1, each beamforming element of the succeeding cascade levels further including delay lines to prevent beamforming at each of the succeeding cascade levels from commencing prior to beamforming at each preceding cascade level.

11. A cascaded adaptive beamforming system according to claim 1, wherein:
   each beamforming element at the first cascade level being configured to perform beamforming on a pair of distinct sensor output signals and produce a phase-aligned composite signal; and
   each beamforming element of succeeding cascade levels being configured to perform beamforming on a pair of distinct phase-aligned composite signals from a preceding cascade level to produce a phase-aligned composite signal.

12. A cascaded adaptive beamforming system according to claim 1, wherein:
   for a single beamforming element at the first cascade level, the beamforming processor is configured to perform beamforming on a distinct pair of the sensor output signals and to produce a phase-aligned composite signal; and for a single beamforming element at each succeeding cascade level, the beamforming processor configured to perform beamforming on a pair of input signals consisting of the phase-aligned composite signal from a preceding cascade level and a distinct sensor output signal to produce a phase-aligned composite signal.

13. A cascaded adaptive beamforming system according to claim 1, wherein:
for each beamforming element at the first cascade level, the beamforming processor is configured to perform beamforming on a pair of sensor output signals to produce a phase-aligned composite signal, wherein the beamforming processor is configured to process one of the pair of sensor output signals in each of two beamforming elements at the first cascade level; and
for each beamforming element at each succeeding cascade level, the beamforming processor is configured to perform beamforming on a pair of phase-aligned composite signals from a preceding cascade level and to produce a phase-aligned composite signal, wherein the beamforming processor, at each succeeding cascade level is configured to process one of the pair of phase-aligned composite signals from the preceding cascade level in each of two beamforming elements at the succeeding cascade level.

14. A cascaded adaptive beamforming system according to claim 1, wherein the beamforming processor comprises a real-time computing architecture in which the beamforming elements are implemented in hardware and the beamforming elements at each cascade layer operate in parallel.

15. A cascaded adaptive beamforming system according to claim 14, wherein the beamforming processor comprises a plurality of FIFO buffers for storing and delaying the phase-aligned composite signals between cascade levels.

16. A cascaded adaptive beamforming system according to claim 1, wherein:
the plurality of sensors are further configured to transmit signals;
the signals received by the sensors include reflections of the signals transmitted by the sensors; and
the beamforming processor is configured to produce the signals transmitted by the sensors using at least one of (1) estimated time delays from beamforming of the sensor output signals or (2) filter weights from beamforming of the sensor output signals.

17. A cascaded adaptive beamforming system according to claim 1, wherein the beamforming processor comprises a computer processor and a memory storing computer program instructions that, when implemented on the computer processor, implement the beamforming elements in the cascade arrangement.

18. A cascaded adaptive beamforming processor for processing sensor output signals from a plurality of sensor elements and producing a beamformed output signal from the sensor output signals, the beamforming processor comprising:
a plurality of beamforming elements coupled in a cascade arrangement having a first cascade level and a plurality of succeeding cascade levels, the first cascade level and each succeeding cascade level including a beamforming element configured to perform beamforming on two input signals to produce a phase-aligned composite signal from the two input signals, each beamforming element having (a) a filter structured to estimate time delay between the two input signals, (b) two adjustable time delay elements structured to phase-align the two input signals based upon estimated time delay, and (c) a summer for combining the two input signals, after processing by the adjustable time delay elements, to produce the phase-aligned composite signal.

19. A cascaded adaptive beamforming processor according to claim 18, wherein the phase-aligned composite signal is sum of (a) a delayed version of a first one of the two input signals phase-aligned with a second one of the two input signals and (b) the second one of the two input signals.

20. A cascaded adaptive beamforming processor according to claim 18, wherein each beamforming element is configured to perform a time delay estimation based on the two input signals and to produce the phase-aligned composite signal based on the time delay estimation.

21. A cascaded adaptive beamforming processor according to claim 18, wherein each beamforming element comprises an adaptive filter for at least one of (1) outputting a time delay estimation based on the two input signals, (2) outputting the phase-aligned composite signal, or (3) outputting adaptive filter weights of the adaptive filter.

22. A cascaded adaptive beamforming processor according to claim 21, wherein each adaptive filter is an LMS filter.

23. A cascaded adaptive beamforming processor according to claim 22, wherein each LMS filter has length 2.

24. A cascaded adaptive beamforming processor according to claim 18, wherein each beamforming element comprises a first adjustable time delay element for adding an adjustable amount of delay to a first input signal of the two input signals, a second adjustable time delay element for adding an adjustable amount of delay to a second input signal of the two input signals, and a summer for combining the outputs of the first and second adjustable time delay elements to produce the phase-aligned composite signal.

25. A cascaded adaptive beamforming processor according to claim 18, wherein each beamforming element is configured to perform upsampling and interpolation on each of the two input signals to allow for phase-alignment of the signals when the time delay between the two input signals is less than one sample time.

26. A cascaded adaptive beamforming processor according to claim 18, each beamforming element further comprising delay lines configured to prevent beamforming at each succeeding cascade level prior to performing the beamforming at each preceding cascade level.

27. A cascaded adaptive beamforming processor according to claim 18, wherein:
each beamforming element at the first cascade level is configured to perform beamforming on a pair of distinct sensor output signals and to produce a phase-aligned composite signal; and
each beamforming element at each succeeding cascade level configured to perform beamforming on a pair of distinct phase-aligned composite signals from a preceding cascade level to produce a phase-aligned composite signal.

28. A cascaded adaptive beamforming processor according to claim 18, wherein:
the first cascade level includes a single beamforming element configured to perform beamforming on a distinct pair of the sensor output signals to produce a phase-aligned composite signal; and
each succeeding cascade level includes a single beamforming element configured to perform beamforming on a pair of input signals consisting of the phase-aligned composite signal from a preceding cascade level and a distinct sensor output signal to produce a phase-aligned composite signal.

29. A cascaded adaptive beamforming processor according to claim 18, wherein:
 each beamforming element at the first cascade level is configured to perform beamforming on a pair of sensor output signals to produce a phase-aligned composite signal, wherein one of the pair of sensor output signals is coupled to two beamforming elements at the first cascade level; and
 each beamforming element at each succeeding cascade level is configured to perform beamforming on a pair of phase-aligned composite signals from a preceding cascade level to produce a phase-aligned composite signal, wherein one of the pair of phase-aligned composite signals from a preceding cascade level is coupled to two beamforming elements at the succeeding cascade level.

30. A cascaded adaptive beamforming processor according to claim 18, further comprising a plurality of FIFO buffers for storing and delaying the phase-aligned composite signals between cascade levels.

31. A cascaded adaptive beamforming processor according to claim 18, wherein:
 the plurality of sensors are further configured to transmit signals;
 the signals received by the sensors include reflections of the signals transmitted by the sensors; and
 the beamforming processor is configured to produce the signals transmitted by the sensors using at least one of (1) estimated time delays from beamforming of the sensor output signals or (2) filter weights from beamforming of the sensor output signals.

32. A cascaded adaptive beamforming method for processing sensor output signals from a plurality of sensors in a cascade arrangement having a first cascade level and a plurality of succeeding cascade levels and producing a beamformed output signal from the sensor output signals, the method comprising:
 at the first cascade level, processing at least one pair of sensor output signals to estimate, for each pair of sensor output signals, time delay between the sensor output signals of the pair and, based upon estimated time delay, produce a phase-aligned composite signal from each pair by using a summer; and
 at each succeeding cascade level, processing at least one pair of input signals to estimate, for each pair of input signals, time delay between the input signals of the pair and, based upon estimated time delay, produce a phase-aligned composite signals from each pair of signals by using a summer, wherein at least one of each pair of input signals is a phase-aligned composite signal from a preceding cascade level.

33. A cascaded adaptive beamforming method according to claim 32, further comprising outputting the phase-aligned composite signal produced by a last one of the succeeding cascade levels as the beamformed output signal.

34. The cascaded adaptive beamforming method according to claim 33, further comprising, at each succeeding cascade level and prior to the step of processing the input signals to produce the phase-aligned composite signal, adding delay to the input signals to prevent beamforming at each succeeding cascade level prior to beamforming at each preceding cascade level.

35. The cascaded adaptive beamforming method according to claim 34, the step of adding comprising passing the input signals through respective FIFO buffers of adjustable length.

36. A cascaded adaptive beamforming system according to claim 1,
 each beamforming element at the first cascade level being coupled with two of the sensors to receive two respective sensor output signals as the two input signals; and
 the beamforming processor being configured to output the phase-aligned composite signal produced by a last one of the succeeding cascade levels as the beamformed output signal.

37. A cascaded adaptive beamforming system according to claim 36,
 each beamforming element at the first cascade level being configured to perform beamforming on a pair of distinct sensor output signals to produce a phase-aligned composite signal; and
 each beamforming element at the succeeding cascade levels being configured to perform beamforming on a pair of distinct phase-aligned composite signals from a preceding cascade level to produce a phase-aligned composite signal.

38. A cascaded adaptive beamforming system according to claim 1, each beamforming element further comprising:
 two adjustable time delay elements structured to phase-align the two input signals, respectively, based upon estimated time delay.

39. A cascaded adaptive beamforming system according to claim 1, in each beamforming element, the filter implementing an LMS filter for estimating the time delay.

40. A cascaded adaptive beamforming system according to claim 10, each of the delay lines being a FIFO buffer of adjustable length.

41. A cascaded adaptive beamforming processor according to claim 18,
 each beamforming element at the first cascade level being coupled with two of the sensors to receive two respective sensor output signals as the two input signals; and
 the beamforming processor being configured to output the phase-aligned composite signal produced by a last one of the succeeding cascade levels as the beamformed output signal.

42. A cascaded adaptive beamforming system according to claim 18, in each beamforming element, the filter implementing an LMS filter for estimating the time delay.

43. A cascaded adaptive beamforming processor according to claim 26, each of the delay lines being a FIFO buffer of adjustable length.

* * * * *